US007640190B1

(12) United States Patent
Sullivan et al.

(10) Patent No.: US 7,640,190 B1
(45) Date of Patent: Dec. 29, 2009

(54) SYSTEMS AND METHODS FOR TRANSACTION AND INFORMATION MANAGEMENT

(75) Inventors: Robert E. Sullivan, Plano, TX (US); Richard Falcone, Addison, TX (US); John J. Viola, Keller, TX (US); Lee R. Johnson, Plano, TX (US)

(73) Assignee: Evercom Systems, Inc., Dallas, TX (US)

( * ) Notice: Subject to any disclaimer, the term of this patent is extended or adjusted under 35 U.S.C. 154(b) by 1476 days.

(21) Appl. No.: 10/602,233

(22) Filed: Jun. 24, 2003

(51) Int. Cl.
*G06Q 30/00* (2006.01)
(52) U.S. Cl. .................. 705/26; 705/1; 379/114.01; 379/189
(58) Field of Classification Search ............ 705/26, 705/27; 379/114, 189
See application file for complete search history.

(56) References Cited

U.S. PATENT DOCUMENTS

| 5,345,501 | A | | 9/1994 | Shelton | |
|---|---|---|---|---|---|
| 5,485,507 | A | * | 1/1996 | Brown et al. | 379/88.08 |
| 6,108,642 | A | * | 8/2000 | Findley | 705/44 |
| 6,668,045 | B1 | * | 12/2003 | Mow | 379/88.19 |
| 7,106,843 | B1 | * | 9/2006 | Gainsboro et al. | 379/191 |
| 7,158,621 | B2 | * | 1/2007 | Bayne | 379/114.13 |
| 7,203,301 | B1 | * | 4/2007 | Mudd et al. | 379/220.01 |
| 7,372,949 | B1 | * | 5/2008 | Kurth et al. | 379/196 |
| 2003/0076940 | A1 | * | 4/2003 | Manto | 379/114.05 |
| 2004/0029564 | A1 | * | 2/2004 | Hodge | 455/411 |
| 2005/0141678 | A1 | * | 6/2005 | Anders | 379/67.1 |
| 2007/0041545 | A1 | * | 2/2007 | Gainsboro | 379/188 |

OTHER PUBLICATIONS

Brian Womack. Boise dot.com aids transfers of money to prison inmates. The Idaho Business Review. Jan. 22, 2001.*
U.S. Appl. No. 10/135,878, John J. Viola, entitled "Information Management and Movement System and Method," filed Apr. 29, 2002.
U.S. Appl. No. 10/135,883, Dick Falcone et al., entitled "Optimizing Profitability in Business Transactions," filed Apr. 29, 2002.
U.S. Appl. No. 10/360,248, Richard Falcone et al., entitled "Systems and Methods for Account Establishment and Transaction Management Using Interrupt Messaging," filed Feb. 7, 2003.
U.S. Appl. No. 10/360,442, Richard Falcone et al., entitled "Systems and Methods for Transaction Authorization Determination," filed Feb. 7, 2003.

* cited by examiner

*Primary Examiner*—Jason Dunham
(74) *Attorney, Agent, or Firm*—Fogarty, L.L.C.

(57) ABSTRACT

Disclosed are systems and methods which utilize information communication systems for transaction and information management. According to embodiments, an automated information management engine is provided enabling and facilitating the purchase of goods and services through various payment options resulting in increased profitability and visibility safely, securely and conveniently. Embodiments utilize a telephony system, and/or other information communication system, having access terminals disposed within a controlled environment facility for use by residents thereof to conduct transactions or other desirable exchanges of information, goods, services, etcetera. Embodiments provide integration across various aspects of transaction and information management, such as prepaid account management, collect calling services, and commissary services, to thereby facilitate seamless user interaction for account deposit, account status inquiry, commissary ordering, and collect calling. Interactive systems of embodiments operate intelligently to facilitate and/or optimize use thereof, such as to identify low account status and implement interaction to solicit deposit of funds.

18 Claims, 8 Drawing Sheets

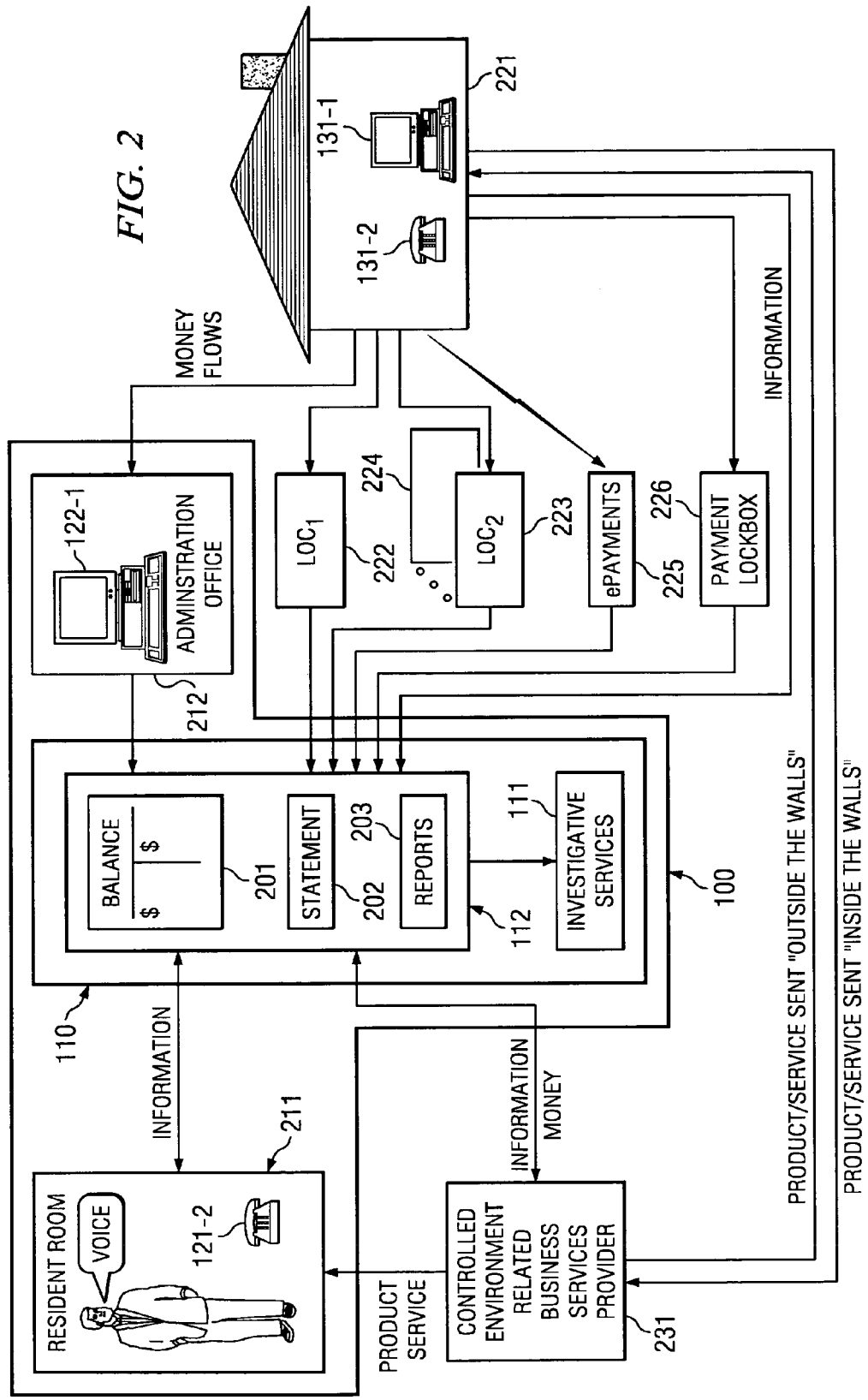

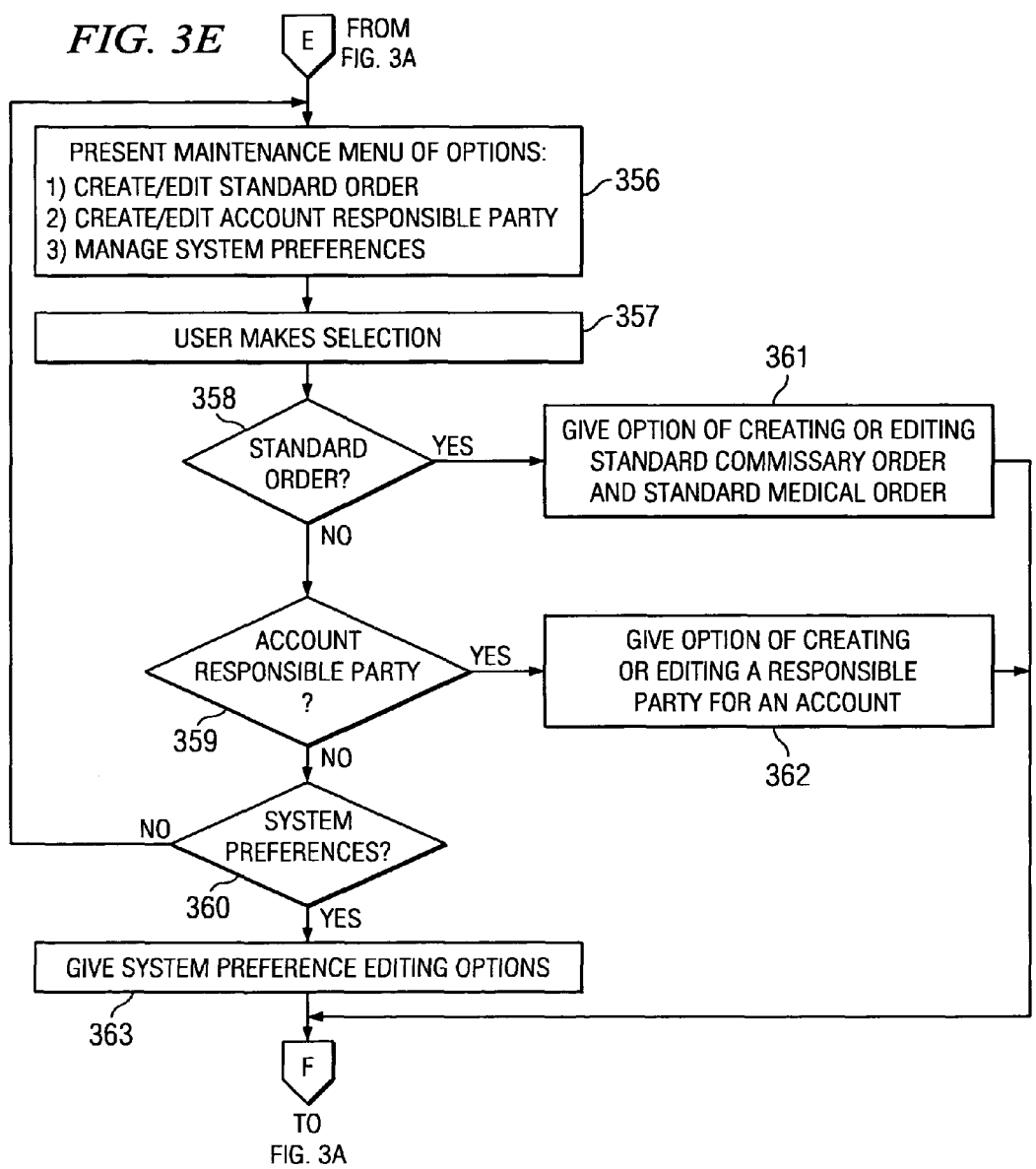

SYSTEMS AND METHODS FOR TRANSACTION AND INFORMATION MANAGEMENT

CROSS-REFERENCE TO RELATED APPLICATIONS

The present application is related to co-pending and commonly assigned U.S. patent application Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/360,248 entitled "System and Method for Account Establishment and Transaction Management Using Interrupt Messaging," filed Feb. 7, 2003, and Ser. No. 10/360,442 entitled "Systems and Methods for Transaction Authorization Determination," filed Feb. 7, 2003, the disclosures of which are hereby incorporated herein by reference.

TECHNICAL FIELD

The present invention is related generally to information communication systems and, more particularly, to systems and methods utilizing information communication systems for transaction and information management.

BACKGROUND OF THE INVENTION

In a controlled environment, such as within a prison or jail facility, controlling access, information, interaction, and/or transactions is often of particular interest. In a prison facility in particular, safety and security is of paramount importance and, therefore, the number one job of the personnel thereof is to effectively implement controls with respect to the residents (inmates) thereof. However, such controlled environments often provide an environment much like a small city in which a number of individuals work and live, thus requiring various goods and/or services associated with civilized society. Accordingly, various exchanges of information, money, goods, etcetera may be performed in association with individuals of a controlled environment, both within the controlled environment and external thereto. For example, an inmate residing in a prison facility may be allowed to place phone calls to friends and family outside of the prison facility. Likewise, an inmate may be allowed to purchase commissary items, such as through use of a prepaid account funded by friends and family, such as when visiting the prison facility or by mailing checks or money orders on behalf of an inmate. An inmate may also be provided medical services, such as dispensing of prescription medications.

Administering the aforementioned exchanges of information, money, goods, etcetera typically requires the time and efforts of the staff of the controlled environment facility and/or individuals associated with various service providers thereto. For example, prison and/or commissary personnel may be required to accept payments directly from visitors or receive mail including payments, identify the individual resident for which the funds are intended, access an account associated with the individual resident, and increment the balance thereof. Additionally, prison and/or commissary personnel may be required to distribute and collect commissary order forms to/from inmates as well as deliver commissary items to inmates. Such personnel may additionally or alternatively be called upon repeatedly to perform such tasks as respond to balance inquiries, explain account deductions/credits, and/or the like. Each such task requires time away from prison personnel's primary tasks associated with the operation of the controlled environment facility and/or increases the costs associated with a service provider serving that population. Moreover, such tasks as accomplished today are typically largely paper based and require appreciable manual processing, thereby further aggravating the directing of personnel's attention away from tasks more primary to the operation of the controlled environment facility and further adding to the costs. FIG. 4 illustrates a commissary process flow according to a typical implementation today.

In addition to issues with respect to taking time and attention away from tasks of primary importance, the aforementioned exchanges may present safety and other issues. For example, increased contact between prison personnel and inmates can increase the danger to the prison personnel, thus interaction associated with distributing and collecting commissary orders may actually present increased danger to prison personnel. Likewise, interaction in providing commissary services can present danger to individuals, such as third party service providers, as well. Additionally, collection of monies by prison personnel for deposit in inmate accounts can expose such personnel to claims of theft of such monies.

The aforementioned exchanges also often do not result in ideal situations with respect to businesses and/or individuals associated with controlled environment facilities. For example, companies providing commissary items to a prison typically must print, distribute, collect, and process a large number of paper order sheets in order to conduct transactions with inmates. If a price change is to be made or items are to be added/deleted from the offering, old forms are discarded and new forms printed and distributed, which results not only in costly waste but also increases the time required in implementing such a change.

Often the aforementioned paper sheets allow individuals to simply write in desired items, thereby requiring personnel at the commissary provider to manually process orders. Even where some level of automation is implemented, such as by using machine readable SCANTRON "fill in the bubble" forms, it has been found that a number of such forms, e.g., 2%, do not scan and still require manual processing. Additionally, spoilage associated with such forms has been found to be considerable, often requiring distribution of approximately 4 forms for every 1 form actually resulting in an order for goods/services. Accordingly, inefficiencies exist with respect to the businesses and individuals conducting such exchanges associated with controlled environment facilities.

Moreover, satisfaction with respect to the individuals upon who's behalf such exchanges are conducted, e.g., inmates residing within a prison facility, is often less than optimum. For example, inmates using the aforementioned paper sheets to order commissary items may have no idea whether the items they desire are in stock or even whether they have enough money in their account to purchase any or all of what they desire, until such time as their order is to be delivered and it is partially or wholly unfulfilled. Typically the only way for an individual to obtain an account balance, and thereby know a priori the extent of goods or services which may be purchased, is to make an inquiry to personnel of the controlled environment facility. Often such personnel must look through accounting records, sometimes requiring reconciling past orders, to provide the requested account information, thereby placing further demands upon their time for tasks not related to the primary function of the facility. Often there is no mechanism for inquiring as to the availability of particular goods and services before the individual has submitted the order.

In addition to the above customer satisfaction issues associated with individuals residing within a controlled environment facility, individuals external thereto which conduct exchanges therewith are often less than satisfied with the experience. For example, depositing monies on behalf of a friend or family residing within a controlled environment facility typically requires delivering such monies directly to the controlled environment facility or sending checks or money orders by mail, leaving little flexibility with respect to the forms and timing of payment. Additionally, the sending party is not provided with any confirmation of the monies received.

BRIEF SUMMARY OF THE INVENTION

The present invention is directed to systems and methods which utilize information communication systems for transaction and information management. According to embodiments of the invention, an automated information management engine is provided enabling and facilitating the purchase of goods and services through various payment options resulting in increased profitability and visibility safely, securely and conveniently. Embodiments of the present invention are particularly useful with respect to transaction and information management associated with controlled environment facilities, such as inmate facilities (e.g., municipal jails, county jails, state prisons, federal prisons, military stockades, juvenile facilities, and detention camps), hospitals, nursing homes, camps, schools, and the like.

A preferred embodiment of the invention utilizes a telephony system, and/or other information communication system, having access terminals disposed within a controlled environment facility for use by residents thereof. Such access terminals may comprise general purpose user terminals, such as telephones, computer systems, personal digital assistants, etcetera, and/or special purpose user terminals, such as kiosks, automatic teller machines, etcetera. Accordingly, a resident of the controlled environment facility is facilitated to utilize an access terminal to conduct transactions or other desirable exchanges of information, goods, services, etcetera. For example, an inmate in a prison facility may utilize a telephone system adapted according to the present invention to perform such functions as ordering items, such as commissary items, medical items, and library books, for himself or others (even individuals residing outside of the prison), inquire as to the status of ordered goods and services, inquire as to an account balance available to the inmate, place phone calls, including prepaid and collect calls, receive information about court dates or other appointments, receive special messages, announcements, and special offers, and/or the like.

Moreover, access terminals utilized according to embodiments of the present invention are disposed external to the aforementioned controlled environment facility for use by individuals residing outside of the facility. For example, friends or family of an inmate in a prison facility may utilize a telephone system adapted according to the present invention to perform such functions as ordering items, such as commissary items, medical items, and library books, for the inmate, inquire as to the status of ordered goods and services, create and/or deposit monies into an account available to the inmate, inquire as to the account balance available to the inmate, inquire as to the status, e.g., medical condition, dispensation of medication, etcetera, of an inmate, place phone calls, and/or the like.

Accordingly, individuals may be empowered by embodiments of the invention to conduct a variety of transactions, including ordering medical products, ordering services from a doctor, ordering commissary items, placing phone calls, and the like, by picking up a phone and speaking or keying commands. The individuals may be given the freedom to select not only from a variety of transactions, but also a variety of payment methods, such as prepaid, collect, credit card, debit, etcetera.

Embodiments of the present invention provide for direct interaction by users, whether individuals residing within a controlled environment facility, individuals residing outside of a controlled environment facility, or individuals associated with a controlled environment facility and/or service providers thereto, for transaction and information management using an intuitive interface, such as may implement voice and/or dual tone multiple frequency (DTMF) input. Interactive systems of embodiments of the present invention provide voice response, voice recognition, and/or other information communication to provide prompting to users, to accept user input and queries, to respond to queries, to confirm transactions, to provide account information, etcetera. Accordingly, interaction for conducting transaction and information management is substantially automated and integrated. Moreover, management and updating of information, such as account status, goods and services available, prices for goods and services, etcetera may be accomplished more quickly and economically.

Interaction by users according to embodiments of the present invention includes various authorization and/or verification techniques. For example, voice print technology, finger print scanning, iris scanning, personal identification numbers (PINs), special codes, social security numbers, driver's license numbers and/or the like may be implemented to affirmatively identify individuals for conducting transactions, providing information, to ensure the an individual is receiving appropriate goods/services, etcetera. Such authorization and/or verification may be implemented with respect to various functions, such as commissary ordering, medication dispensation, etcetera to restrict availability of goods and/or services or to ensure proper distribution of items. Authorization and/or verification according to preferred embodiments may be implemented with respect to any users, including those residing outside of a controlled environment facility. For example, embodiments of the present invention may implement account deposit authorization with respect to a prison facility to provide control with respect to individuals who may deposit funds with respect to particular inmates.

Preferred embodiments of the present invention provide integration across various aspects of transaction and information management. For example, prepaid account management, collect calling services, and commissary services are all integrated according to one embodiment of the invention, to thereby facilitate seamless user interaction for account deposit, account status inquiry, commissary ordering, and collect calling. Embodiments utilize information technology already present in a controlled environment facility, such as a local area network, an intranet, the Internet, etcetera, to provide communication and interaction with third party suppliers and users desiring their goods and/or services.

Moreover, interactive systems of embodiments of the present invention operate intelligently to facilitate and/or optimize use thereof. For example, embodiments of the present invention may operate to identify low account value status and implement interaction to solicit deposit of funds. Such interaction may include notifying an individual associated with an account (such as an inmate) of a current status and inquiring as to what actions are to be taken, contacting a secondary contact with respect to an account (such as a family member of an inmate) to solicit funds, and/or accepting funds via such means as check by phone, credit card, automatic withdrawal, etcetera. Revenue opportunities, such as commissions due to a controlled access facility and/or profits to entities providing goods and/or services, are preferably increased through the aforementioned embodiments getting more money into the system. For example, by making it easy to get money into the system and/or by providing ease of operation, embodiments of the present invention enable the users to place orders more often, order more goods and/or services, and/or maximize the value of their available funds.

Preferred embodiments of the present invention further provide monitoring and/or intelligence gathering functionality. For example, inmate behavior may be monitored and events predicted, such as riots, through analysis of various interactions, such as orders of commissary goods etcetera. Preferred embodiments of the present invention monitor such behavior velocity of transactions with respect to individuals for providing intelligence reporting. Monitoring and/or intelligence gathering according to embodiments of the present invention may provide audit capabilities, such as to trace what household deposited money into which accounts, how much money was deposited, when the money was deposited, how that money was used, etcetera. Additionally or alternatively, such monitoring and/or intelligence gathering may provide information with respect to who is placing calls to whom, the frequency of such calls, analysis of calls or other transactions to determine relationships between individuals, etcetera. Such monitoring and/or intelligence gathering functionality, particularly when based upon information available from various integrated aspects of transaction and information management, may be invaluable in providing controlled environment management.

It should be appreciated that preferred embodiments of the present invention substantially decrease costs associated with transaction and information management, such as by taking paper and personnel out of the process. Accordingly, embodiments of the present invention deployed with respect to a controlled environment facility facilitate reallocation of man hours to achieve more value from personnel by allowing more time for such personnel to be engaged in tasks primary to the operation of the controlled environment facility. Moreover, security issues in particular situations, such as the aforementioned prison facility environment, may be decreased, e.g., interaction between prison facility and/or other third party service personnel and inmates may be decreased thereby diminishing opportunity for security breaches. Likewise, primary aspects of a controlled environment facility, such as security in a prison facility, may be increased according to embodiments of the present invention using authorizations and checks and balances provided by system automation and integration.

Embodiments of the present invention provide further advantages in that administrative costs of paper forms and personnel associated with services, such as the aforementioned commissary service, are reduced. Moreover, the ability to make changes, such as to change product offerings and/or pricing, is not only more economical but may also be implemented much more quickly. Infrastructure costs, such as equipment for scanning order forms and/or for personnel to manually key in orders, may be reduced according to embodiments of the present invention by leveraging information processing systems, such as call processing systems and the associated user terminals, already deployed or otherwise deployed for integrated aspects of the present invention. Moreover, embodiments of the present invention provide increased order accuracy and increased speed, e.g., speed of information exchange and order processing is increased and users receive real-time responses with respect to their orders and queries. Embodiments of the present invention provide increased markets, such as by allowing residents of a controlled environment facility to order goods and services for individuals residing outside the controlled environment facility and vice versa. Additionally, embodiments of the present invention increase revenues from existing markets as individuals are empowered to place orders more often (e.g., not limited to one time per week when paper forms are scheduled to be collected), allowing an individual to place orders for goods or services when it is convenient and when the need or desire is on that individual's mind. Real-time feedback with respect to account balance and/or order confirmation facilitates an individual maximizing orders without fear of being denied some or all desired goods/services. Such advantages not only result in increased revenue for service providers, such as commissary companies, providing the goods/services, but also can result in increased revenue to the controlled environment facility, such as where a commission structure is in place.

It should be appreciated that embodiments of the present invention provide increased customer satisfaction, such as through improved timeliness and accuracy with respect to information. For example, interaction provided by systems operable according to the present invention may provide confirmation of orders, real time responses to queries, etcetera, thereby resulting in increased customer satisfaction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 shows detail with respect to an exemplary deployment of the controlled environment information management system of FIG. 1A;

FIGS. 3A-3E show a flow diagram of operation of the controlled environment information management system of FIG. 2 according to an embodiment of the present invention.

DETAILED DESCRIPTION OF THE INVENTION

Controlled environment facilities, such as inmate facilities, hospitals, nursing homes, and camps, may be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests (hereinafter referred to as residents), and a number of individuals and enterprises indirectly associated therewith, including friends and family of residents, vendors, government agencies, providers of services to residents, and individuals with a connection to the facility or its residents. Information is often exchanged and transactions are often conducted by, between, among, and on behalf of the aforementioned individuals and enterprises in performing the aforementioned daily activities.

It shall be appreciated that in such a controlled environment, there may be unique relationships, situations, and information which may be leveraged in providing management functions or in conducting transactions. For example, information flowing from residents may be monitored and/or processed in an intelligence area to ensure the safety and security of those within the controlled environment facility and those outside of the facility. Moreover, information with respect to individuals and/or enterprises having an interest in residents of the controlled environment facility may be utilized in facilitating transactions, such as toll telephone calls and the purchase of commissary items. Accordingly, preferred embodiments of the present invention provide integration of various functional aspects associated with a controlled environment facility to provide transaction and information management.

Figure 1A:
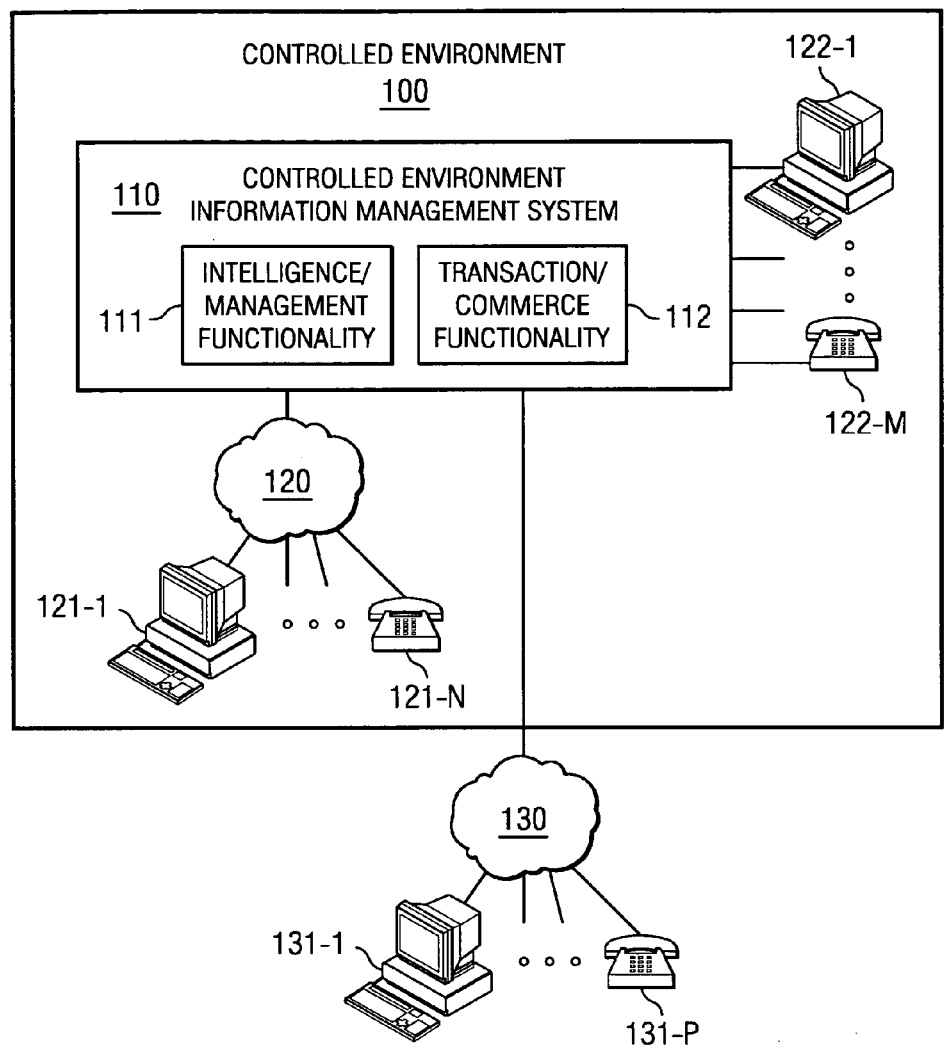
FIG. 1A shows a block diagram of a controlled environment information management system deployed according to a preferred embodiment of the present invention.

Directing attention to FIG. 1A, a controlled environment information management system of the present invention is shown according to a preferred embodiment to provide transaction and information management within and associated with a controlled environment facility. Specifically, controlled environment information management system 110 is deployed within controlled environment facility 100. Although illustrated as being deployed within the controlled environment facility in FIG. 1A, it should be appreciated that controlled environment information management systems of the present invention may be deployed in a number of configurations. For example, embodiments of the present invention provide an information management system deployed external to the controlled environment facility and having data terminals and/or other access points deployed within the controlled environment facility. Additionally or alternatively, information management systems may be provided in a distributed topology, such as having server systems, application programs, and/or databases distributed throughout a number of geographic locals, according to embodiments of the present invention.

As shown in FIG. 1A, controlled environment information management system 110 may provide a number of access points coupled to a variety of user terminal equipment configurations. User terminal equipment utilized according to preferred embodiments of the present invention may include personal computers, personal digital assistants (PDAs), pagers, telephones (wireline and wireless), facsimile machines, kiosks, and the like, coupled through direct links, such as wireline, cable, fiber optic, etcetera, and/or indirect links, such as network links (e.g., local area networks (LANs), metropolitan area networks (MANs), wide area networks (WANs), intranets, extranets, the Internet, cellular networks, the public switched telephone network (PSTN), and/or the like), private branch exchange (PBX) links, etcetera. Accordingly, information management system 110 of the illustrated embodiment provides connectivity to user terminals 122-1 through 122-M disposed within controlled environment facility 100 via direct connections, user terminals 121-1 through 121-N disposed within controlled environment facility 100 via indirect connections (here comprising a network or networks, referred to herein as network 120), and user terminals 131-1 through 131-P disposed external to controlled environment facility 100 via indirect connections (here comprising XML connections and/or a network or networks, referred to herein as network 130). It should be appreciated that information communication links utilized according to the present invention are not limited to wireline links and, therefore, may utilize wireless, optical, and/or other information communication links.

In accordance with the preferred embodiment of the present invention, controlled environment information management system 110 is adapted to include intelligence/management functionality 111 and transaction/commerce functionality 112. Preferably, intelligence/management functionality 111 provides for collection, storage, and movement of information for managing various operational aspects of the controlled environment facility, including the management of personnel, residents, vendors, and resources. Transaction/commerce functionality 112 preferably provides for the instigation and completion of various transactions, including requesting and providing goods and services, determining credit worthiness, verifying account balance and status, and providing for payment. The aforementioned functionality is preferably provided according to the present invention at any distance and at any time.

It should be appreciated that, although intelligent/management functionality 111 and transaction/commerce functionality 112 are shown in FIG. 1A disposed in controlled environment information management system 110, various structural and/or functional aspects of these components may be provided by different entities and/or may be disposed inside of and outside of controlled environment facility 100. For example, a controlled environment facility may implement core transaction/commerce functionality in the form of a call application management system, and a third party commissary may interface enhanced transaction/commerce functionality in the form of commissary services thereto. Additionally or alternatively, a third party (whether the same or different than the above third party) may interface intelligence/management functionality with the transaction/commerce functionality. Multiple systems, whether disposed remotely, locally, or combinations thereof, may be utilized in implementing the aforementioned controlled environment information management system 110.

Figure 1B:
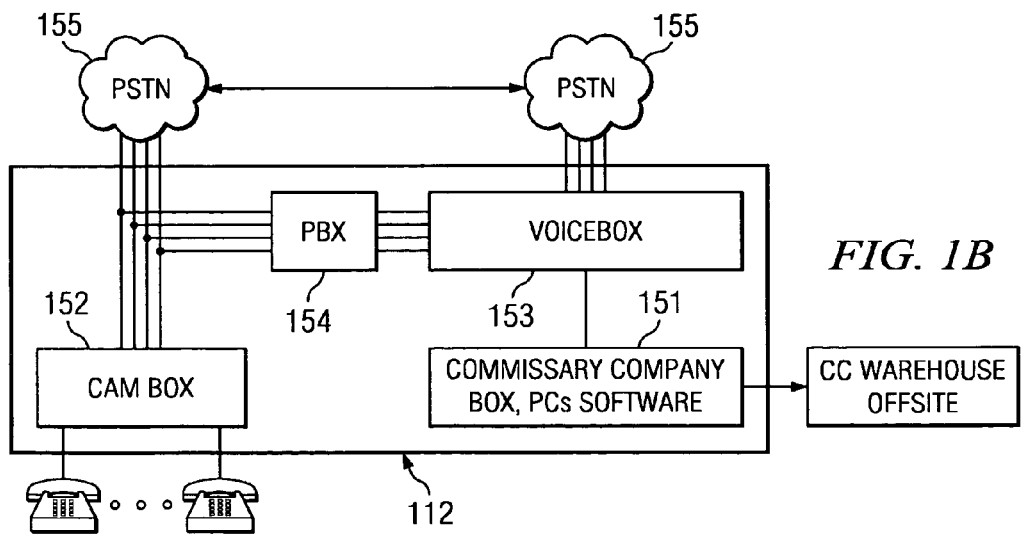
FIGS. 1B and 1C show detail with respect to aspects of the controlled environment information management system of FIG. 1A according to embodiments of the present invention.
Figure 1C:
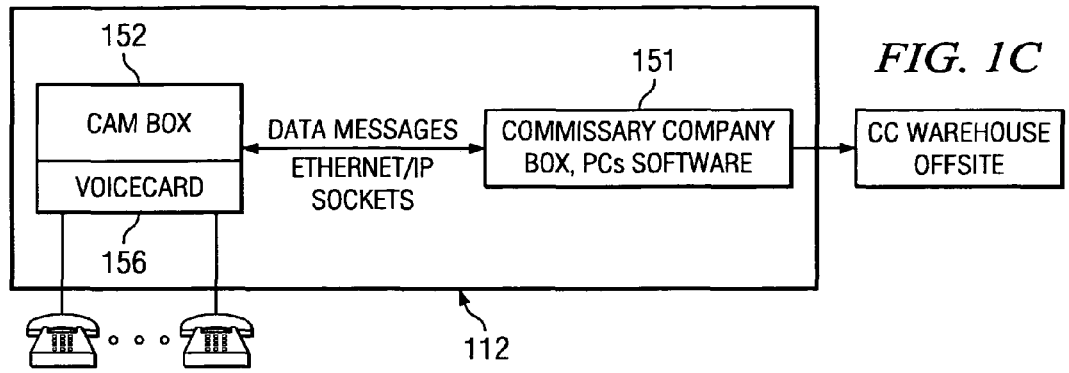
Figure 3D:
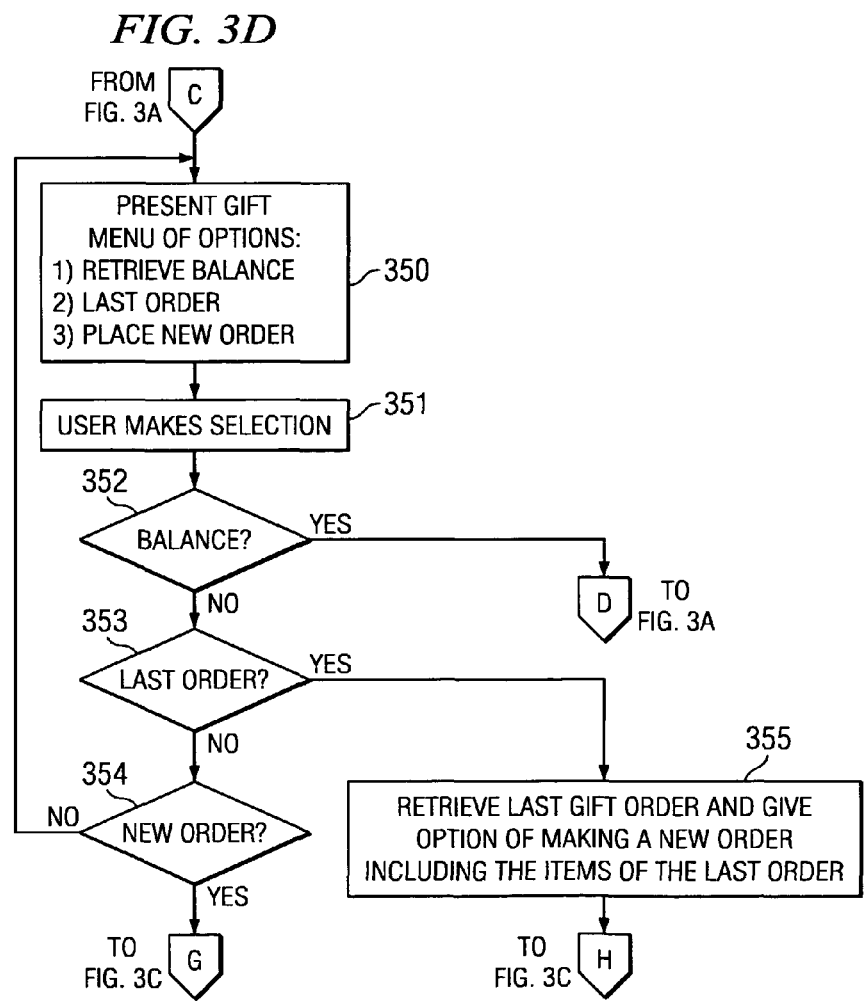
Figure 3A:
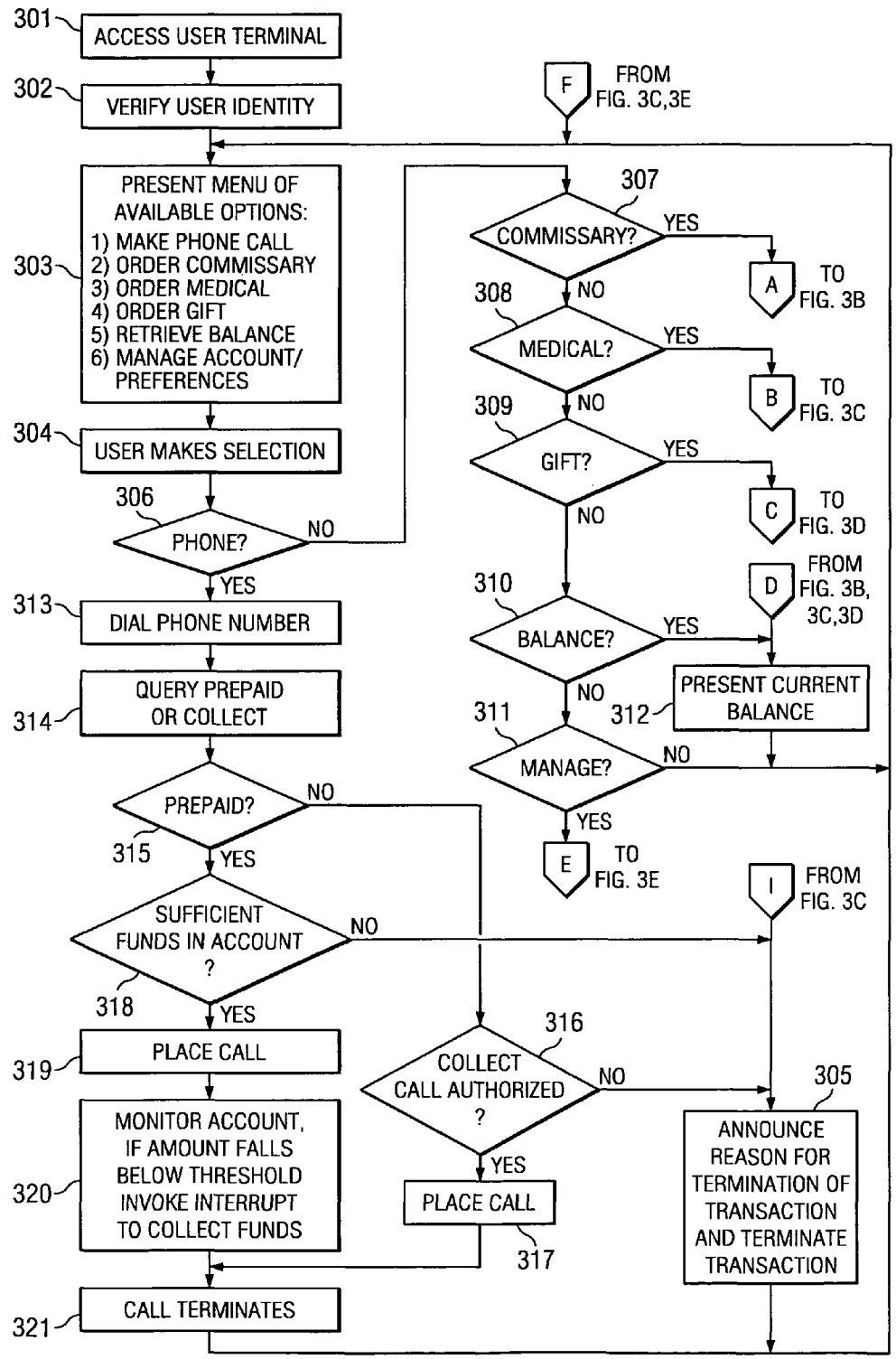
Figure 3B:
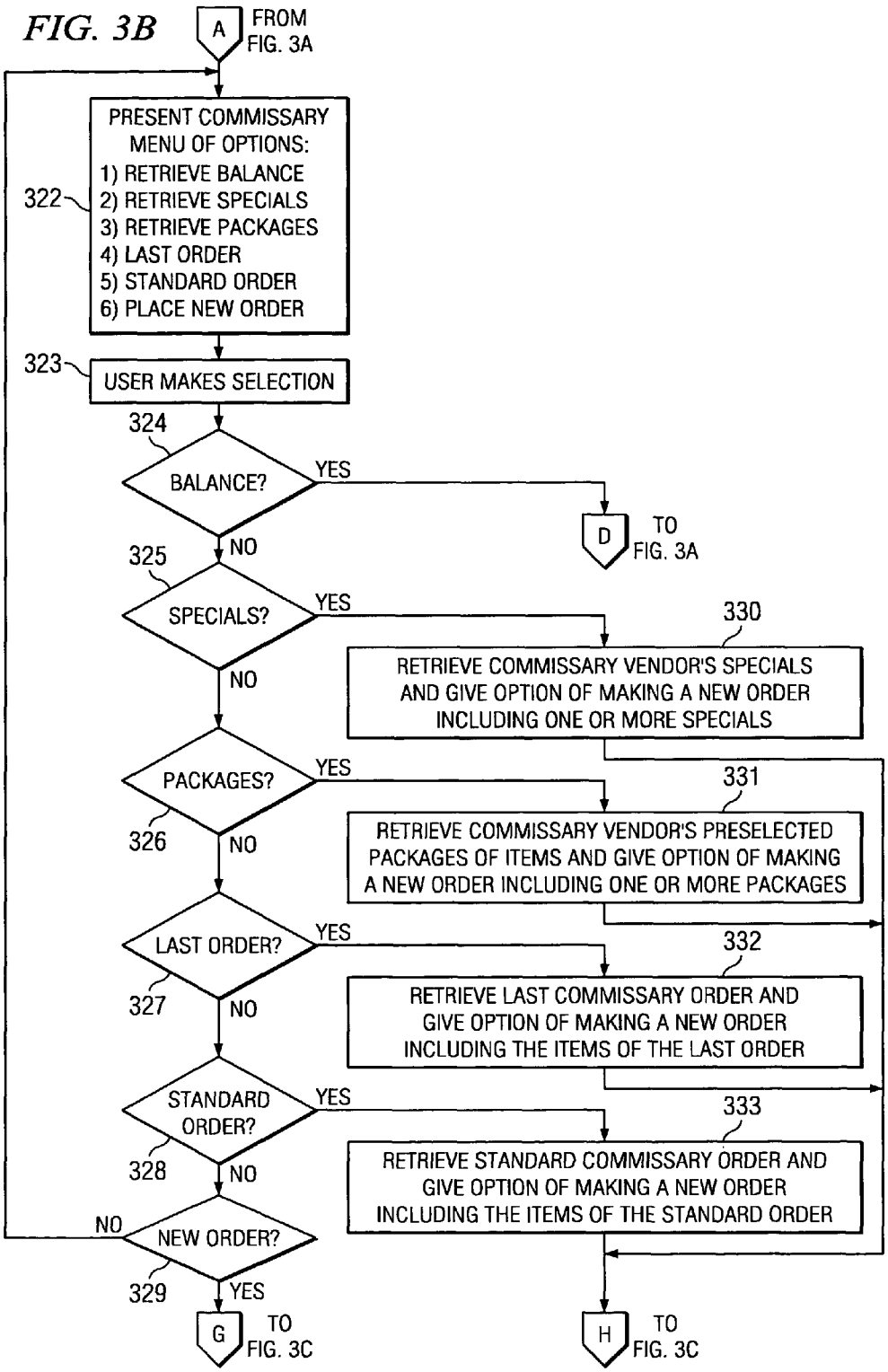
Figure 3C:
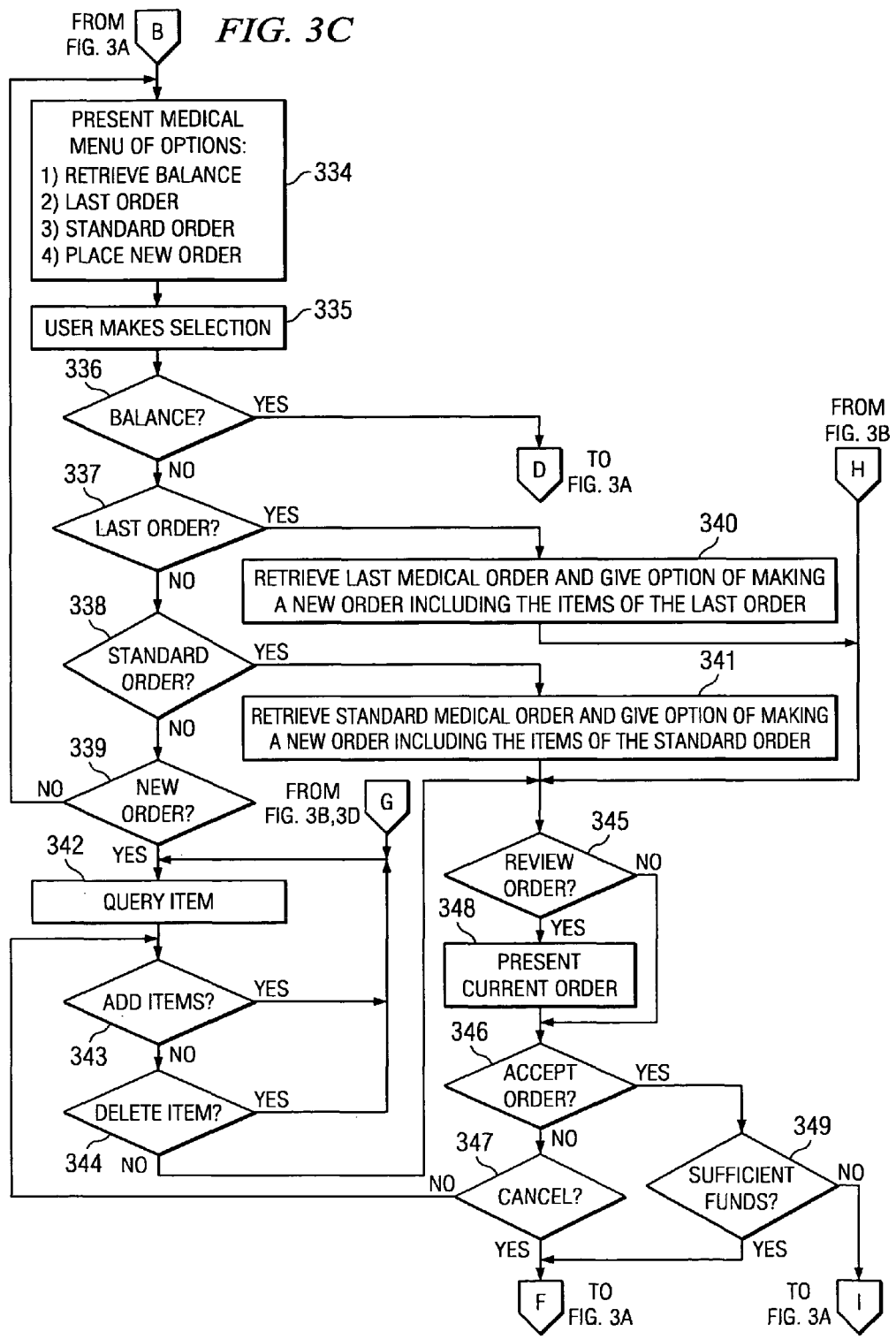
Figure 4:
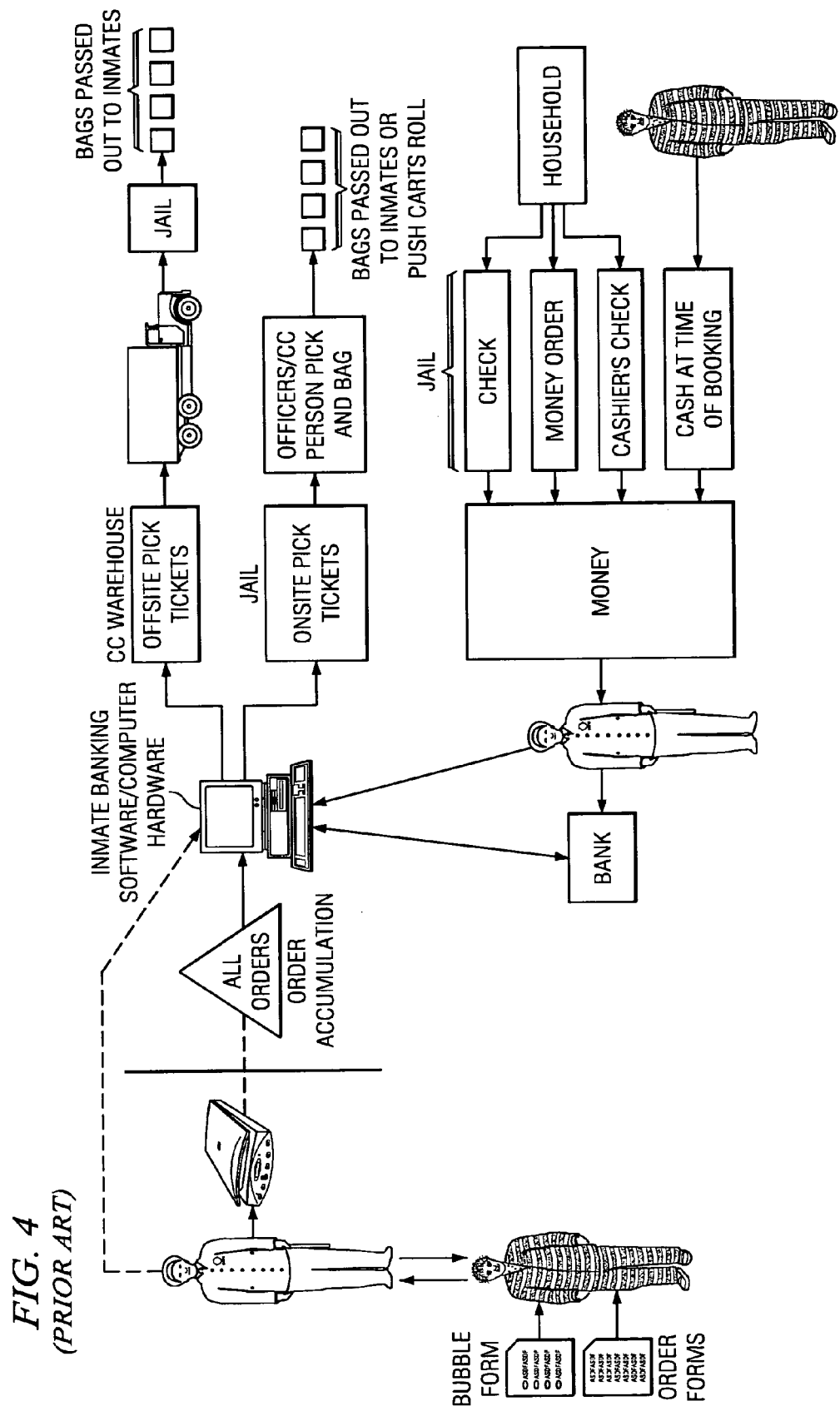
FIG. 4 shows an implementation of a typical commissary service.

Directing attention to FIGS. 1B and 1C, various configurations in which a commissary company provides structural and/or functional aspects of transaction/commerce functionality 112 are shown. For example, in the embodiment of FIG. 1B, commissary company hardware and software (box 151) is coupled to a controlled environment call application management system (box 152) via voice lines using a voice system (box 153), such as may comprise a VRU. The voice lines may be internal to the controlled environment facility, such as provided by PBX 154, and/or external to the controlled environment facility, such as provided by PSTN 155. In the embodiment of FIG. 1C, commissary company hardware and software (box 151) is coupled to a controlled environment call application management system (box 152) via data lines using data communication protocols, such as Ethernet and IP sockets. Preferably, the data connection between the controlled environment call application management system and a commissary company system is via a trusted connection, such as may be provided by the aforementioned IP sockets. Although raw data or data which is provided in proprietary formats may be exchanged, embodiments of the present invention utilize a flexible data interface or protocol, such as may utilize extensible markup language (XML), to facilitate connection of a variety of systems from a variety of companies. Such flexibility facilitates the use of legacy systems, whether those of the controlled environment facility or those of the service providers, as well as offers freedom in selecting a service provider best suited for the situation. Voice interfacing with users may be provided by a voice/data interface of the call application management system, such as voice card 156. It should be appreciated that one or more of the components of transaction/commerce functionality 112 illustrated in FIGS. 1B and 1C may be disposed external to controlled environment facility 100, according to embodiments of the invention.

The functionality provided by particular systems or entities involved in providing operation as described herein may be altered depending upon a configuration implemented. For example, in the embodiment illustrated in FIG. 1B above, the controlled environment facility call application management system may provide menu options to allow selection of a commissary service, provide speed dial numbers to access the commissary company system, limit times at which orders may be placed and/or duration of calls placing orders, and record user interaction to provide verification/proof of orders etcetera. Correspondingly, the commissary company system may provide a speech interface to communicate commissary information to a user, provide balance maintenance, maintenance of pricing and products offered, restrictions on products available to individuals, menus and reports, and accounting functions. In the embodiment illustrated in FIG. 1C above, the controlled environment facility call application management system may provide menu options not only for selecting a commissary service, but may also provide menus for interaction with the commissary company system in ordering goods, querying status of orders and accounts, etcetera. Such menus may be provided as an extensible interface (such as is common with a web browser architecture) where data from the commissary company system controls the options presented at any particular time. The controlled environment facility call application management system may further provide conversion of data to speech and/or speech to data to facilitate user interaction with the commissary company system. In addition to providing data interchange with the commissary company system, the controlled environment facility call application management system may provide recording of user interaction to provide verification/proof of orders etcetera. The commissary company system of FIG. 1C may receive data from the call application management system and provide data thereto. The commissary company system may be responsible for information such as product descriptions, menus, pricing, and account balances, as well as establishing restrictions on what goods are available to particular individuals, generating reports, and providing accounting functions.

Directing attention to FIG. 2, detail with respect to an exemplary deployment of an embodiment of the present invention is shown. As shown in FIG. 2, controlled environment information management system 110 provides transaction and information management and connectivity with respect to a plurality of entities. For example, individuals disposed within controlled environment facility 100, such as residents of controlled environment facility 100 having access to resident room 211 (such as may comprise a hospital room, prison cell, camp cabin, common use room, etcetera), are provided access to controlled environment information management system 110 for interaction therewith, such as via telephone 121-2. Additionally, in the embodiment of FIG. 2, individuals disposed in controlled environment facility 100, such as controlled environment personnel having access to administrative office 212 (such as may comprise a patient information station, a doctor's office, a general administration office, a guard station, etcetera), are provided access to controlled environment information management system 110 for interaction therewith, such as via computer 122-1. Individuals disposed outside of controlled environment facility 100, such as friends and family residing at residence 221 are provided access to controlled environment information management system 110 for interaction therewith, such as via computer 131-1 and/or telephone 131-2. Additionally, in the embodiment of FIG. 2, individuals disposed outside of controlled environment facility 100 are provided access to controlled environment information management system 110 for interaction therewith at locations 222 through 224, such as may be associated with various businesses, service providers, and/or the like, such as via any of terminals 131-1 through 131-P. Controlled environment related business services providers 231, such as telephony service providers, commissary goods and services providers, health care providers, etcetera, as may be disposed in and/or outside of controlled environment facility 100 are provided access to controlled environment information management system 110 for interaction therewith, such as via any of terminals 121-1 through 121-N, 122-1 through 122-M, and/or 131-1 through 131-P.

It should be appreciated that, although particular embodiments of user terminals have been shown or referenced above with respect to particular individuals and/or locations, the present invention is not limited to the use of any particular user terminal configuration or configurations with respect to individuals and/or locations. For example, administration office 212 may additionally or alternatively include telephones for providing interaction with controlled environment information management system 110. Moreover, there is no limitation according to the present invention with respect to the number of user terminals which may be provided with respect to an individual and/or location.

It should further be appreciated that, although particular individuals and/or locations have been shown or referenced above for interaction with controlled environment information management system 110, the present invention is not limited to the individuals and/or locations of the exemplary embodiment. For example, embodiments of the invention may provide connectivity for interaction between a plurality of controlled environment facilities, if desired.

According to a preferred embodiment, controlled environment information management system 110 is deployed in association with a prison facility. In operation according to an exemplary embodiment wherein controlled environment facility 100 is a prison facility, an inmate may pick up a phone, such as telephone 121-2, and communicate information to controlled environment information management system 110 to access limited information and/or conduct certain proscribed transactions. Controlled environment information management system 110 may take that information, or some portion thereof, and communicate it to an inmate related business service provider, such as controlled environment related business services provider 231. This entity may, responsive to such information, provide a product or service to the inmate. For example, particular authorized goods may be delivered to the prisoner within controlled environment facility 100. Additionally or alternatively, services, such as medical care or telephony services may be provided to the inmate.

The aforementioned resident's use of controlled environment information management system 110 is not limited to transactions for the acquisition of goods and/or services. For example, the aforementioned inmate may utilize the aforementioned phone to query controlled environment information management system 110 for a status report with respect to goods previously ordered, the balance of an account, the current status of inmate privileges, information with respect to scheduled events, such as court dates and hearings, special messages and announcements, etcetera, such as may be provided by reporting system 203.

It should be appreciated that the flow of information and/or goods and services of various transactions is not limited to delivery to a resident (inmate in the above example) of controlled environment facility 100. For example, an inmate may utilize controlled environment information management system 110 to provide goods and services, such as a birthday gift or other item, to friends and family, such as residing at residence 221 outside of controlled environment facility 100. Similarly, friends and family may utilize controlled environment information management system 110 to provide goods and services to the inmate inside of controlled environment facility 100. Additionally, friends and family may utilize controlled environment information management system 110 to query information regarding the status of goods previously ordered, the balance of an account, the current condition of an inmate, etcetera, such as may be provided by reporting system 203.

According to preferred embodiments, account balances are maintained for individuals using controlled environment information management system 110, such as an account balance for inmates and/or friends and family, which may be utilized in paying for the aforementioned goods and services. The illustrated embodiment, for example, includes account balance database 201 of transaction/commerce functionality 112. Account balance database 201 may comprise prepaid account balances and/or post paid account balances and is preferably utilized with respect to various transactions conducted using controlled environment information management system 110. For example, payment for goods ordered by a prisoner or friends and family may be made by a transfer of credit value from controlled environment information management system 110 to controlled environment related business services provider 231, such as using statement system 202.

Funds may be provided to account balance database 201 in a number of ways, such as various means of deposit by friends and family of an inmate. For example, friends and family may deposit funds into the system via such techniques as sending a money order or a cashier's check via the mail or bringing cash into the prison at the time of visitation for entry into the system, such as by administration office 212. However, to facilitate the deposit of such funds, preferred embodiments provide for indirect, remote, and/or electronic deposit, such as via locations 222 through 224, electronic payment system 225, and payment lockbox 226, such as shown and described in the above referenced patent application entitled "Information Management and Movement System and Method." For example, locations 222 through 224 may be associated with various business locations, such as a pawn shop, a grocery store, a rental center, a check cashing center, etcetera, where an individual may go and provide payment, such as in the form of cash, check, or credit card, for deposit into a particular account of account balance database 201. Electronic payments may be made using a credit card, check conversion, or electronic funds transfer, for example, via electronic payment system 225, such as may comprise the Internet or a telephony system. Additionally or alternatively, a payment lockbox or lockboxes, such as payment lockbox 226, may be provided in association with controlled environment information management system 110 to accept payment, such as in the form of cash, check, money order, credit card, electronic fund transfer, etcetera. Such locations and/or payment techniques may be more convenient to such individuals and thereby facilitate their depositing funds into controlled environment information management system 110.

In operation according to a preferred embodiment, controlled environment information management system 110 monitors, processes, and/or compiles information with respect to transactions and information processed therethrough. For example, statement system 202 and report system 203 may cooperate to derive information with respect to what household deposited money for a particular inmate, what goods and services that inmate ordered, and generate various reports about usage of the system by individuals. Such information may be provided to investigative services of intelligence/management functionality 111 for analysis, and perhaps appropriate action.

Having described an exemplary deployment of an embodiment of the present invention, attention is directed toward FIGS. 3A-3E wherein a flow diagram of operation of controlled environment information management system 110 of the exemplary deployment is shown. At step 301 a user, such as a resident of the controlled environment facility (e.g., an inmate in a prison facility), accesses a user terminal, such as one of terminals 121-1 through 121-N, in communication with controlled environment information management system 110. It should be appreciated that operation of embodiments of the present invention may provide functionality, or portions thereof, as described below with respect to any number of users, such as individuals outside of the controlled environment facility, personnel of the controlled environment facility, etcetera. However, it is expected that various menu options and functionality may be made available to particular users or groups of users, as will be described in further detail below with respect to an individual outside of the controlled environment facility using an embodiment of the present invention.

According to the illustrated embodiment, the user's identity is verified at step 302. Verification of the user may comprise providing authentication and/or identification information such as name, personal identification number (PIN), or even biometric information. For example, an inmate may be prompted to speak his name into a telephone receiver or other microphone for voice print analysis by controlled environment information management system 110. Additionally or alternatively, biometric information may be collected using specialized interfaces, such as finger print scanners, retinal scanners, iris scanners, etcetera. Moreover, user identity verification according to embodiments of the present invention may comprise multiple authentication/identification techniques. For example, a user may be prompted to speak his name as well as input a PIN in order to provide a high level of confidence with respect to identification verification. Embodiments of the present invention may alternate the use of one or more such techniques to discourage attempts at defeating identification verification.

At step 303 a menu of available options is presented to the user. For example, where the user is accessing controlled environment information management system 110 via a telephone, a voice response unit (VRU) thereof may speak the various options. Where the user is accessing controlled environment information management system 110 via a computer or other terminal having display capability, a menu image may be displayed. Such menu presentation techniques may be combined, such as to present a blended interface, if desired.

The illustrated embodiment provides a menu in which the options "make a phone call," "order commissary," "order medical," "order gift," "retrieve balance," and "manage account/preference" are presented. The menu options of the exemplary embodiment illustrate versatility with respect to conducting transactions provided by preferred embodiments of the present invention. For example, menu options "make phone call," "order commissary," and "order medical" provide for a resident of a controlled environment facility to acquire goods and/or services for himself, without requiring administration by controlled environment facility personnel. Similarly, the aforementioned menu options "make phone call," "order commissary," and "order medical" provide for an individual outside of a controlled environment facility, such as a friend or family member of a resident, to acquire goods and/or services for the resident of the controlled environment facility. Of course, the individual outside of the controlled environment facility may additionally or alternatively be enabled to obtain such goods and/or services for himself and a resident of a controlled environment facility may additionally or alternatively be enabled to obtain such goods and/or services for another resident of the controlled environment facility, if desired. Menu option "order gift" provides for a resident of a controlled environment facility to acquire goods and/or services for others, such as an individual outside of a controlled environment facility or another resident in the controlled environment facility, again without requiring administration by controlled environment facility personnel. Additionally, menu options "retrieve balance" and "manage account/preferences" provide for a user to independently perform certain administration functions without the assistance of controlled environment facility personnel. Of course, it should be appreciated that the illustrated menu options are merely exemplary and, therefore, embodiments of the present invention may include different and/or alternative options as desired.

At step 304 the user makes a selection with respect to a menu option. For example, the user may speak "phone" or press 1 to select "make phone call," speak "commissary" or press 2 to select "order commissary," speak "medical" or press 3 to select "order medical," speak "gift" or press 4 to select "order gift," speak "balance" or press 5 to select "retrieve balance," or speak "manage" or press 6 to select "manage account/preferences." Of course, any grammar and/or input characters may be utilized in selecting menu options according to the present invention and, therefore, the present invention is not limited to those of the illustrated embodiment.

Steps 306 through 311 operate to determine which menu option has been selected by a user and processing proceeds accordingly. If an invalid selection is made, processing proceeds through steps 306 through 311 and returns to represent the menu at step 303 in the illustrated embodiment.

If, at step 306 of the illustrated embodiment, it is determined that the user has selected "make phone call," processing proceeds to steps 313 through 321 for call processing. Call processing according to the illustrated embodiment begins at step 313 wherein the user dials a phone number to be called. Embodiments of the invention may analyze the dialed number for various purposes before allowing a call thereto to be completed. For example, the dialed number may be compared to a database of prohibited numbers (whether prohibited with respect to the particular user or globally prohibited) and/or a database of allowed numbers (whether allowed with respect to the particular user or globally allowed) before further call processing is allowed.

At step 314 controlled environment information management system 110 queries the user as to how the call is to be paid for, e.g., debited from a prepaid account or placed collect (charges reversed to the called party). Embodiments may make such a determination automatically, such as by using the user identification information to determine if the user has an account associated therewith and/or analyzing the dialed number to determine if a collect call thereto is to be permitted. Additionally or alternatively, a user may select a preference for how calls are to be paid for to avoid being queried or to establish a default using the aforementioned mange account/preferences option.

A determination is made as to whether the call is prepaid at step 315 of the illustrated embodiment. If the call is not prepaid, step 316 of the illustrated embodiment makes a determination as to whether a collect call is authorized. For example, the called number may be analyzed to determine if risk of payment is acceptable, such as using techniques shown and described in the above referenced patent applications entitled "Optimizing Profitability in Business Transactions" and "Systems and Methods for Transaction Authorization Determination." If a collect call is not authorized, processing proceeds to step 305 wherein an announcement is made as to the reason the transaction is not being completed and processing according to the illustrated embodiment proceeds to step 303 wherein the menu of options are again presented. However, if a collect call is authorized, processing proceeds to step 317 wherein the call is completed. Thereafter, the user or the called party may terminate the call at step 321 and processing may return to step 303 for presentation of menu options to the user, according to the illustrated embodiment.

If, at step 315, it is determined that the call is prepaid, processing proceeds to step 318 of the illustrated embodiment. At step 318 a determination is made as to whether sufficient funds are available in an account associated with or accessible by the user. For example, controlled environment information management system 110 may analyze the dialed number to make a determination with respect to a minimum account balance available before allowing the call to be completed. Additionally or alternatively, controlled environment information management system 110 may analyze information with respect to the user and/or called party, such as historical information (e.g., length of calls, charges incurred for calls, etcetera), in making a determination with respect to whether sufficient funds are in an account.

If sufficient funds are determined not to be in an account associated with or accessible to the user, processing proceeds to step 305 wherein an announcement is made as to the reason the transaction is not being completed and processing according to the illustrated embodiment proceeds to step 303 wherein the menu of options are again presented. Embodiments of the present invention are not limited to use of prepaid accounts for conducting transactions. For example, if an account balance is too low to accommodate a current transaction, embodiments of the present invention may utilize risk assessment tools and/or third party billing techniques, such as shown and described in the above referenced patent applications entitled "Optimizing Profitability in Business Transactions" and "Systems and Methods for Transaction Authorization Determination," to make a credit assessment for allowing the transaction to be conducted on a post paid basis. If the credit assessment meets a threshold level, embodiments of the invention may operate to allow a transaction or transactions to be conducted, such as up to a predetermined dollar value. However, if the credit assessment does not meet a threshold level, and the user does not have enough funds in an account available thereto, then the transaction, or some portion thereof, may not be allowed. Alternatively, other techniques may be implemented in an attempt to complete the transaction, such as to place an outbound call (e.g., to an individual identified as being responsible for the account and/or the party to which the attempted call is directed) to deliver a message regarding the need for account funds in order to complete the attempted call.

If sufficient funds are determined to be in an account associated with or accessible to the user at step 318, processing proceeds to step 319 wherein the call is completed. To prevent a completed call from incurring charges in excess of an available account balance, the illustrated embodiment monitors the call with respect to the account balance at step 320, and may terminate the call if the funds are exhausted.

However, preferred embodiments of the present invention operate to facilitate replenishment of such account balances, such as by invoking interrupt messaging to solicit funds from the called party, as shown and described in the above referenced patent application entitled "System and Method for Account Establishment and Transaction Management Using Interrupt Messaging," as a minimum threshold amount is reached. Additionally or alternatively, replenishment of account balances may be facilitated according to embodiments of the invention through contacting a designated responsible party with respect to the account. For example, an outbound message, e.g., a phone call, electronic mail message, etcetera, may be sent by controlled environment information management system 110 to one or more friend or family member designated as a responsible party (e.g., the party who created the account, the party last depositing funds to the account, the party designated by the inmate, etcetera) with respect to an inmate's account to solicit deposit of funds upon detection of a minimum threshold amount. Additionally or alternatively, controlled environment information management system 110 may set a flag with respect to the account balance condition such that, the next time the responsible party is called by the user, interrupt messaging is invoked to solicit funds from the responsible party during the call.

If the call is not otherwise terminated, such as because of an account balance being exhausted, the user or the called party may terminate the call at step 321. Thereafter, processing may return to step 303 for presentation of menu options to the user, according to the illustrated embodiment.

If, at step 307 of the illustrated embodiment, it is determined that the user has selected "order commissary," processing proceeds to steps 322 through 333 and 342 through 349 for commissary order processing. Commissary order processing according to the illustrated embodiment begins at step 322 wherein a menu of available options is presented to the user. For example, where the user is accessing controlled environment information management system 110 via a telephone, a VRU thereof may speak the various options. Where the user is accessing controlled environment information management system 110 via a computer or other terminal having display capability, a menu image may be displayed. Such menu presentation techniques may be combined, such as to present a blended interface, if desired.

The illustrated embodiment provides a menu in which the options "retrieve balance," "retrieve specials," "retrieve packages," "last order," "standard order," and "place new order" are presented. It should be appreciated that the illustrated menu options are merely exemplary and, therefore, embodiments of the present invention may include different and/or alternative options as desired. For example, embodiments may present a menu option "check order status" which involves steps (not shown) to provide information with respect the current status of a previously placed order, it desired.

At step 323 the user makes a selection with respect to a menu option. For example, the user may speak "balance" or press 1 to select "retrieve balance," speak "specials" or press 2 to select "retrieve specials," speak "packages" or press 3 to select "retrieve packages," speak "last" or press 4 to select "last order," speak "standard" or press 5 to select "standard order," or speak "new" or press 6 to select "new order." Of course, any, grammar and/or input characters may be utilized in selecting menu options according to the present invention and, therefore, the present invention is not limited to those of the illustrated embodiment.

Steps 324 through 329 operate to determine which menu option has been selected by a user and processing proceeds accordingly. If an invalid selection is made, processing proceeds through steps 324 through 329 and returns to represent the menu at step 322 in the illustrated embodiment.

If, at step 324 of the illustrated embodiment, it is determined that the user has selected "retrieve balance," processing proceeds to step 312 for presentation of an available account balance. It should be appreciated that, although the illustrated embodiment provides for return to the main option menu of step 303 upon presentation of an account balance, embodiments of the present invention may operate to proceed to various steps after presenting an account balance, such as depending upon a point at which a user requested the balance information. For example, having been invoked from step 324, step 312 may proceed to step 322 to again present commissary menu options, if desired.

At step 325 if it is determined that the user has selected "retrieve specials," processing proceeds to step 330. At step 330 special promotion items, specially priced items, inventory clearance items, etcetera are identified to the user. Processing according to step 330 of a preferred embodiment allows a user to select one or more of the specials for adding to a current order. Thereafter, processing according to the illustrated embodiment proceeds to steps 342 through 349 for further order processing with respect to commissary items. Accordingly, the "retrieve specials" menu option allows a service provider to easily highlight particular goods and services to a user as well as allowing the user to easily identify and take advantage of such specials.

At step 326 if it is determined that the user has selected "retrieve packages," processing proceeds to step 331. At step 331 preselected combinations or "packages" of items, such as a "welcome" package which might include a combination of such items as common toiletries, bed sheets, etcetera typically required by a new resident, are identified to the user. Processing according to step 331 of a preferred embodiment allows a user to select one or more of the packages for adding to a current order. Thereafter, processing according to the illustrated embodiment proceeds to steps 342 through 349 for further order processing with respect to commissary items. Accordingly, the "retrieve packages" menu option allows a commissary service provider to easily promote particular combinations of goods and services to a user as well as allowing the user to easily identify and acquire useful combinations of goods and services.

At step 327 if it is determined that the user has selected "last order," processing proceeds to step 332. At step 332 the last commissary order placed by the user is detailed to the user. Processing according to step 332 of a preferred embodiment allows a user to select the previous order, or some portion thereof, for adding to a current order. Thereafter, processing according to the illustrated embodiment proceeds to steps 342 through 349 for further order processing with respect to commissary items. Accordingly, the "last order" menu option allows a user to easily identify and repeatedly order goods and services.

At step 328 if it is determined that the user has selected "standard order," processing proceeds to step 333. At step 333 a "standard" commissary order or orders, e.g., a particular combination of items as may be specified by the user such as utilizing the "manage account/preferences" option, are detailed to the user. Processing according to step 333 of a preferred embodiment allows a user to select a standard order, or some portion thereof, for adding to a current order. Thereafter, processing according to the illustrated embodiment proceeds to steps 342 through 349 for further order processing with respect to commissary items. Accordingly, the "standard order" menu option allows a user to easily identify and repeatedly order goods and services.

At step 329 if it is determined that the user has selected "place new order," processing proceeds to steps 342 through 349 for identification, selection, and/or removal of commissary items to create a new order. Step 342 of the illustrated embodiment queries the user for goods and/or services to be added to the current order. For example, controlled environment information management system 110 may present a list of items and their associated prices to a user for selection. Additionally or alternatively, a user may be provided with a commissary catalog, such as in hard copy or on-line, from which items for selection may be identified. According to the illustrated embodiment, a user may select one or more items at step 342 and processing will proceed to step 343 wherein a determination is made as to whether the user wishes to add additional items to the current order. Selection of items may, for example, be accomplished by a user specking keywords and/or by other user input, such as DTMF.

It should be appreciated that in allowing a user to make selections at step 342, embodiments of the present invention may perform order validation steps, such as confirming that an account balance available to the user is sufficient to purchase the items currently selected, that each selected item is currently in the commissary inventory, that the user is authorized or otherwise allowed to obtain the selection (e.g., a diabetic may be prevented from ordering candy, an inmate on suicide watch may be prevented from ordering sheets or razors, etcetera), and/or the like. Preferred embodiments provide order validation, restriction, and confirmation immediately with respect to each item selected, thus providing immediate account balance update and allowing a user to know immediately what may and may not be ordered. Implementation of such order validation is not limited to operation of step 342 of the illustrated embodiment. For example, order validation may be performed with respect to current order creation associated with any of steps 330 through 333, if desired. The aforementioned order validation provides improved customer satisfaction as the user receives substantially immediate feedback with respect to their ability to acquire desired goods and services.

If the user wishes to add additional items to the current order, as determined at step 343, processing returns to step 342 for adding additional items to the current order according to the illustrated embodiment. However, if it is determined that the user does not wish to add additional items to the current order at step 343, processing proceeds to step 344.

If the user wishes to delete items from the current order, as determined at step 344, processing returns to step 342 for removing items from the current order according to the illustrated embodiment. However, if it is determined that the user does not wish to delete items from the current order at step 344, processing proceeds to step 345.

At step 345 it is determined whether the user wishes to review the current order. If the user wishes to review the current order, processing proceeds to step 348 wherein the current order is presented to the user. However, if it is determined that the user does not wish to review the current order, processing proceeds to step 346.

At step 346 it is determined whether the user wishes to accept the current order. If it is determined that the user does not wish to accept the current order, processing proceeds to step 347, wherein a determination is made as to whether the user wishes to cancel the current order. If the user wishes to cancel the current order, processing according to the illustrated embodiment proceeds to step 303 wherein menu options are again presented to the user. However, if it is determined that the user does not wish to cancel the order, processing returns to step 343 to determine if the user wishes to add items to the current order.

If, at step 346, it is determined that the user does wish to accept the current order, processing proceeds to step 349. Step 349 of the preferred embodiment provides validation of the completed current order. For example, an account balance available to the user may be checked to confirm that sufficient funds are available for the current order. Step 349 may additionally or alternatively operate to flag or deduct the appropriate funds, such as to prevent a user from placing additional orders prior to delivery of the current order without having sufficient funds for each such order.

If sufficient funds are not available, as determined at step 349, processing may proceed to step 305 wherein an announcement is made as to the reason the transaction is not being completed and processing according to the illustrated embodiment proceeds to step 303 wherein the menu of options are again presented. If sufficient funds are available, the order may be entered and processing returned to step 303 wherein menu options are again presented to the user, according to the illustrated embodiment.

However, preferred embodiments of the present invention operate to facilitate replenishment of such account balances, such as by invoking interrupt messaging to solicit funds as a minimum threshold amount is reached through contacting a designated responsible party with respect to the account, as shown and described in the above referenced patent application entitled "System and Method for Account Establishment and Transaction Management Using Interrupt Messaging." For example, an outbound message, e.g., a phone call, electronic mail message, etcetera, may be sent by controlled environment information management system 110 to one or more friend or family member designated as a responsible party (e.g., the party who created the account, the party last depositing funds to the account, the party designated by the inmate, etcetera) with respect to an inmate's account to solicit deposit of funds upon detection of a minimum threshold amount. Additionally or alternatively, controlled environment information management system 110 may set a flag with respect to the account balance condition such that, the next time the responsible party is called by the user, interrupt messaging is invoked to solicit funds from the responsible party during the call.

If, at step 308 of the illustrated embodiment, it is determined that the user has selected "order medical," processing proceeds to steps 334 through 349 for medical order processing. Medical order processing according to the illustrated embodiment begins at step 334 wherein a menu of available options is presented to the user. For example, where the user is accessing controlled environment information management system 110 via a telephone, a VRU thereof may speak the various options. Where the user is accessing controlled environment information management system 110 via a computer or other terminal having display capability, a menu image may be displayed. Such menu presentation techniques may be combined, such as to present a blended interface, if desired.

The illustrated embodiment provides a menu in which the options "retrieve balance," "last order," "standard order," and "place new order" are presented. It should be appreciated that the illustrated menu options are merely exemplary and, therefore, embodiments of the present invention may include different and/or alternative options as desired.

At step 335 the user makes a selection with respect to a menu option. For example, the user may speak "balance" or press 1 to select "retrieve balance," speak "last" or press 2 to select "last order," speak "standard" or press 3 to select "standard order," or speak "new" or press 4 to select "new order." Of course, any grammar and/or input characters may be utilized in selecting menu options according to the present invention and, therefore, the present invention is not limited to those of the illustrated embodiment.

Steps 336 through 339 operate to determine which menu option has been selected by a user and processing proceeds accordingly. If an invalid selection is made, processing proceeds through steps 336 through 339 and returns to represent the menu at step 335 in the illustrated embodiment.

If, at step 336 of the illustrated embodiment, it is determined that the user has selected "retrieve balance," processing proceeds to step 312 for presentation of an available account balance. As mentioned above, embodiments of the present invention may operate to proceed to various steps after presenting an account balance, such as depending upon a point at which a user requested the balance information. For example, having been invoked from step 336, step 312 may proceed to step 334 to again present medical menu options, if desired.

At step 337 if it is determined that the user has selected "last order," processing proceeds to step 340. At step 340 the last medical order placed by the user is detailed to the user. Processing according to step 340 of a preferred embodiment allows a user to select the previous order, or some portion thereof, for adding to a current order. Thereafter, processing according to the illustrated embodiment proceeds to steps 342 through 349 for further order processing with respect to medical items. Accordingly, the "last order" menu option allows a user to easily identify and repeatedly order goods and services.

At step 338 if it is determined that the user has selected "standard order," processing proceeds to step 341. At step 341 a "standard" medical order or orders, e.g., a particular combination of items as may be specified by the user such as utilizing the "manage account/preferences" option, are detailed to the user. Processing according to step 341 of a preferred embodiment allows a user to select a standard order, or some portion thereof, for adding to a current order. Thereafter, processing according to the illustrated embodiment proceeds to steps 342 through 349 for further order processing with respect to medical items. Accordingly, the "standard order" menu option allows a user to easily identify and repeatedly order goods and services.

At step 339 if it is determined that the user has selected "place new order," processing proceeds to steps 342 through 349 for identification, selection, and/or removal of medical items to create a new order. As discussed above, step 342 of the illustrated embodiment queries the user for goods and/or services to be added to the current order. A user may select one or more items presented at step 342 and processing will proceed to step 343 wherein a determination is made as to whether the user wishes to add additional items to the current order.

As with creating a commissary order described above, in allowing a user to make selections at step 342, embodiments of the present invention may perform order validation steps, such as confirming that an account balance available to the user is sufficient to purchase the items currently selected, that each selected item is currently in the medical inventory, that the user is authorized or otherwise allowed to obtain the selection (e.g., the user has a prescription for the selected medication, the user does not have allergies to the selected item, the user does not have a substance abuse problem associated with a selected item, the user has not exceeded an repeat order velocity with respect to selected items, etcetera), and/or the like. Implementation of such order validation is not limited to operation of step 342 of the illustrated embodiment. For example, order validation may be performed with respect to current order creation associated with any of steps 340 through 341, if desired. The aforementioned order validation provides improved customer satisfaction as the user receives substantially immediate feedback with respect to their ability to acquire desired goods and services.

If the user wishes to add additional items to the current order, as determined at step 343, processing returns to step 342 for adding additional items to the current order according to the illustrated embodiment. However, if it is determined that the user does not wish to add additional items to the current order at step 343, processing proceeds to step 344.

If the user wishes to delete items from the current order, as determined at step 344, processing returns to step 342 for removing items from the current order according to the illustrated embodiment. However, if it is determined that the user does not wish to delete items from the current order at step 344, processing proceeds to step 345.

At step 345 it is determined whether the user wishes to review the current order. If the user wishes to review the current order, processing proceeds to step 348 wherein the current order is presented to the user. However, if it is determined that the user does not wish to review the current order, processing proceeds to step 346.

At step 346 it is determined whether the user wishes to accept the current order. If it is determined that the user does not wish to accept the current order, processing proceeds to step 347, wherein a determination is made as to whether the user wishes to cancel the current order. If the user wishes to cancel the current order, processing according to the illustrated embodiment proceeds to step 303 wherein menu options are again presented to the user. However, if it is determined that the user does not wish to cancel the order, processing returns to step 343 to determine if the user wishes to add items to the current order.

If, at step 346, it is determined that the user does wish to accept the current order, processing proceeds to step 349.

Step 349 of the preferred embodiment provides validation of the completed current order. For example, an account balance available to the user may be checked to confirm that sufficient funds are available for the current order. Step 349 may additionally or alternatively operate to flag or deduct the appropriate funds, such as to prevent a user from placing additional orders prior to delivery of the current order without having sufficient funds for each such order.

If sufficient funds are not available, as determined at step 349, processing may proceed to step 305 wherein an announcement is made as to the reason the transaction is not being completed and processing according to the illustrated embodiment proceeds to step 303 wherein the menu of options are again presented. If sufficient funds are available, the order may be entered and processing returned to step 303 wherein menu options are again presented to the user, according to the illustrated embodiment.

However, preferred embodiments of the present invention operate to facilitate replenishment of such account balances, such as by invoking interrupt messaging to solicit funds as a minimum threshold amount is reached through contacting a designated responsible party with respect to the account, as shown and described in the above referenced patent application entitled "System and Method for Account Establishment and Transaction Management Using Interrupt Messaging." For example, an outbound message, e.g., a phone call, electronic mail message, etcetera, may be sent by controlled environment information management system 110 to one or more friend or family member designated as a responsible party (e.g., the party who created the account, the party last depositing funds to the account, the party designated by the inmate, etcetera) with respect to an inmate's account to solicit deposit of funds upon detection of a minimum threshold amount. Additionally or alternatively, controlled environment information management system 110 may set a flag with respect to the account balance condition such that, the next time the responsible party is called by the user, interrupt messaging is invoked to solicit funds from the responsible party during the call.

If, at step 309 of the illustrated embodiment, it is determined that the user has selected "order gift," processing proceeds to steps 350 through 355 and 342 through 349 for gift order processing. Gift order processing according to the illustrated embodiment begins at step 350 wherein a menu of available options is presented to the user. For example, where the user is accessing controlled environment information management system 110 via a telephone, a VRU thereof may speak the various options. Where the user is accessing controlled environment information management system 110 via a computer or other terminal having display capability, a menu image may be displayed. Such menu presentation techniques may be combined, such as to present a blended interface, if desired. It should be appreciated that information with respect to selections available to users of embodiments of the present invention may be provided by means other than the aforementioned interactive voice and display menus. For example, and of particular applicability to the "order gift" option, option "catalogs" such as may comprise a gift catalog mailed to potential customers, pre-printed menu lists posted on or near access terminals, Internet web pages providing information with respect to options, and/or the like may be utilized according to the present invention.

The illustrated embodiment provides a menu in which the options "retrieve balance," "last order," and "place new order" are presented. It should be appreciated that the illustrated menu options are merely exemplary and, therefore, embodiments of the present invention may include different and/or alternative options as desired.

At step 351 the user makes a selection with respect to a menu option. For example, the user may speak "balance" or press 1 to select "retrieve balance," speak "last" or press 2 to select "last order," or speak "new" or press 3 to select "new order." Of course, any grammar and/or input characters may be utilized in selecting menu options according to the present invention and, therefore, the present invention is not limited to those of the illustrated embodiment.

Steps 352 through 354 operate to determine which menu option has been selected by a user and processing proceeds accordingly. If an invalid selection is made, processing proceeds through steps 352 through 354 and returns to represent the menu at step 350 in the illustrated embodiment.

If, at step 352 of the illustrated embodiment, it is determined that the user has selected "retrieve balance," processing proceeds to step 312 for presentation of an available account balance. As mentioned above, embodiments of the present invention may operate to proceed to various steps after presenting an account balance, such as depending upon a point at which a user requested the balance information. For example, having been invoked from step 352, step 312 may proceed to step 350 to again present gift menu options, if desired.

At step 353 if it is determined that the user has selected "last order," processing proceeds to step 355. At step 355 the last gift order placed by the user is detailed to the user. Processing according to step 355 of a preferred embodiment allows a user to select the previous order, or some portion thereof, for adding to a current order and/or for changing recipient information, e.g., where and/or to whom a gift is to be delivered. Thereafter, processing according to the illustrated embodiment proceeds to steps 342 through 349 for further order processing with respect to gift items. Accordingly, the "last order" menu option allows a user to easily identify and repeatedly order goods and services.

At step 354 if it is determined that the user has selected "place new order," processing proceeds to steps 342 through 349 for identification, selection, and/or removal of gift items and to provide information with respect to a recipient (whether inside the controlled environment facility or outside the controlled environment facility) of the gift to create a new order. Additional steps may be invoked, if desired, such as to allow the user to indicate where and/or to whom a gift is to be delivered. As discussed above, step 342 of the illustrated embodiment queries the user for goods and/or services to be added to the current order. A user may select one or more items presented at step 342 and processing will proceed to step 343 wherein a determination is made as to whether the user wishes to add additional items to the current order.

As with creating a commissary order described above, in allowing a user to make selections at step 342, embodiments of the present invention may perform order validation steps, such as confirming that an account balance available to the user is sufficient to purchase the items currently selected, that each selected item is currently in the gift (e.g., commissary) inventory, that the user is authorized or otherwise allowed to obtain the selection, and/or the like. Implementation of such order validation is not limited to operation of step 342 of the illustrated embodiment. For example, order validation may be performed with respect to current order creation associated with step 355, if desired. The aforementioned order validation provides improved customer satisfaction as the user receives substantially immediate feedback with respect to their ability to acquire desired goods and services.

If the user wishes to add additional items to the current order, as determined at step 343, processing returns to step 342 for adding additional items to the current order according to the illustrated embodiment. However, if it is determined that the user does not wish to add additional items to the current order at step 343, processing proceeds to step 344.

If the user wishes to delete items from the current order, as determined at step 344, processing returns to step 342 for removing items from the current order according to the illustrated embodiment. However, if it is determined that the user does not wish to delete items from the current order at step 344, processing proceeds to step 345.

At step 345 it is determined whether the user wishes to review the current order. If the user wishes to review the current order, processing proceeds to step 348 wherein the current order is presented to the user. However, if it is determined that the user does not wish to review the current order, processing proceeds to step 346.

At step 346 it is determined whether the user wishes to accept the current order. If it is determined that the user does not wish to accept the current order, processing proceeds to step 347, wherein a determination is made as to whether the user wishes to cancel the current order. If the user wishes to cancel the current order, processing according to the illustrated embodiment proceeds to step 303 wherein menu options are again presented to the user. However, if it is determined that the user does not wish to cancel the order, processing returns to step 343 to determine if the user wishes to add items to the current order.

If, at step 346, it is determined that the user does wish to accept the current order, processing proceeds to step 349. Step 349 of the preferred embodiment provides validation of the completed current order. For example, an account balance available to the user may be checked to confirm that sufficient funds are available for the current order. Step 349 may additionally or alternatively operate to flag or deduct the appropriate funds, such as to prevent a user from placing additional orders prior to delivery of the current order without having sufficient funds for each such order.

If sufficient funds are not available, as determined at step 349, processing may proceed to step 305 wherein an announcement is made as to the reason the transaction is not being completed and processing according to the illustrated embodiment proceeds to step 303 wherein the menu of options are again presented. If sufficient funds are available, the order may be entered and processing returned to step 303 wherein menu options are again presented to the user, according to the illustrated embodiment.

However, preferred embodiments of the present invention operate to facilitate replenishment of such account balances, such as by invoking interrupt messaging to solicit funds as a minimum threshold amount is reached through contacting a designated responsible party with respect to the account, as shown and described in the above referenced patent application entitled "System and Method for Account Establishment and Transaction Management Using Interrupt Messaging." For example, an outbound message, e.g., a phone call, electronic mail message, etcetera, may be sent by controlled environment information management system 110 to one or more friend or family member designated as a responsible party (e.g., the party who created the account, the party last depositing funds to the account, the party designated by the inmate, etcetera) with respect to an inmate's account to solicit deposit of funds upon detection of a minimum threshold amount. Additionally or alternatively, controlled environment information management system 110 may set a flag with respect to the account balance condition such that, the next time the responsible party is called by the user, interrupt messaging in invoked to solicit funds from the responsible party during the call.

If, at step 310 of the illustrated embodiment, it is determined that the user has selected "retrieve balance," processing proceeds to step 312 for presentation of a current balance of an account associated with or otherwise available to the user. For example, where the user is accessing controlled environment information management system 110 via a telephone, a VRU thereof may speak the various current balance. Where the user is accessing controlled environment information management system 110 via a computer or other terminal having display capability, a balance amount may be displayed. Such menu presentation techniques may be combined, such as to present a blended interface, if desired. Processing according to the illustrated embodiment proceeds to step 303 to again present menu options to the user.

Presentation of an account balance at step 312 may provide more information than an account total. For example, where the account has been established such that particular limits, e.g., dollar amounts, are established with respect to purposes for which the account may be used, e.g., X dollars per period are allowed to be used for telephone calls and Y dollars per period are allowed to be used for commissary (referred to herein as subaccounts), information may be provided with respect to amounts available for particular purposes. Such subaccounts may be provided with any desired level of resolution and with respect to any number of transaction types. For example, subaccount limits may be established with respect to medical expenses, gift purchases, library charges, etcetera.

Step 312 according to embodiments of the present invention may provide functionality in addition to presenting an account balance. For example, if an account balance is below a predetermined threshold, embodiments of the present invention may query the user if the user would like to deposit more funds, such as by taking credit card information from the user or initiating a message to an account responsible party.

If, at step 311 of the illustrated embodiment, it is determined that the user has selected "manage account/preferences," processing proceeds to steps 356 through 363 for administration processing. Administration processing according to the illustrated embodiment begins at step 356 wherein a menu of available options is presented to the user. For example, where the user is accessing controlled environment information management system 110 via a telephone, a VRU thereof may speak the various options. Where the user is accessing controlled environment information management system 110 via a computer or other terminal having display capability, a menu image may be displayed. Such menu presentation techniques may be combined, such as to present a blended interface, if desired.

The illustrated embodiment provides a menu in which the options "create/edit standard order," "create/edit account responsible party," and "manage system preferences" are presented. It should be appreciated that the illustrated menu options are merely exemplary and, therefore, embodiments of the present invention may include different and/or alternative options as desired.

At step 357 the user makes a selection with respect to a menu option. For example, the user may speak "standard" or press 1 to select "create/edit standard order," speak "responsible party" or press 2 to select "create/edit account responsible party," or speak "manage" or press 3 to select "manage system preferences." Of course, any grammar and/or input characters may be utilized in selecting menu options according to the present invention and, therefore, the present invention is not limited to those of the illustrated embodiment.

Steps 358 through 360 operate to determine which menu option has been selected by a user and processing proceeds accordingly. If an invalid selection is made, processing proceeds through steps 358 through 360 and returns to represent the menu at step 356 in the illustrated embodiment.

If, at step 358 of the illustrated embodiment, it is determined that the user has selected "create/edit standard order," processing proceeds to step 361 allowing the user to create or edit a standard commissary or medical order. For example, a user may create a standard commissary order including commonly used toiletries, perhaps including the particular brands preferred by the user, and label this standard order "toiletries" to facilitate simplified repeat ordering of such items during the course of a stay at controlled environment facility 100. Similarly, a user may create a standard commissary order including a variety of snacks consumed weekly and label this standard order "snacks" to facilitate simplified weekly ordering of such items. Likewise, a user may create a standard medical order including a preferred brand of cold medicine proven to be effective when used by the user and label this standard order "cold medicine" to allow the user to quickly identify and acquire such medicine when needed. Additionally or alternatively, users may edit particular standard orders, whether initially created by the users or otherwise available on the system, to add or remove items therefrom and thereby revise a standard order to the user's desires/needs. After completion of creating or editing standard orders at step 361, processing may proceed to step 303 for presentation of an option menu to the user.

If, at step 359 of the illustrated embodiment, it is determined that the user has selected "create/edit account responsible party," processing proceeds to step 362 allowing the user to create or edit identification of a party responsible for an account available to the user. For example, a user may identify a particular family member as a responsible party with respect to an account available to the user. The user may provide such information as the phone number and/or address of the designated account responsible party, preferences as to how and/or when this party is to be contacted for such purposes as replenishing funds, what individuals are to have the ability to debit and/or credit the account, what purposes (e.g., telephone call charges, commissary item charges, medical item charges, etcetera) the account is to be utilized for and/or any subaccounts within the account to limit utilization of the account for particular purposes, and/or the like. It should be appreciated that embodiments of the invention provide for a resident within a controlled environment facility establishing a responsible party, such as friends or family, with respect to a particular account, such as an account established by the resident. Moreover, embodiments of the present invention provide for an individual outside of a controlled environment facility to establish a responsible party, such as them self, with respect to a particular account, such as an account established by the individual for the benefit of a resident. Accordingly, an individual may establish and control an account to thereby allow a resident certain privileges, such as prepaid telephone and prepaid commissary purchasing, without fear of the resident using the account for goods and/or services, including particular items, which the responsible does not wish the resident to have. Additionally or alternatively, users may edit account responsible parties and associated information, whether initially created by the users or otherwise available on the system. After completion of creating or editing an account responsible party at step 362, processing may proceed to step 303 for presentation of an option menu to the user.

At step 360 if it is determined that the user has selected "manage system preferences," processing proceeds to step 363. At step 363 the user is presented with various preference editing options. For example, a user may be enabled to set a preference with respect to whether a current account balance is announced prior to any selected ordering activity, whether a running account balance is announced as items are selected, whether telephone calls are to default to collect or prepaid, whether a responsible party is to be contacted when an account reaches a predetermined threshold value, a threshold value for contacting a responsible party, how a responsible party is to be contacted, whether interrupt messaging is to be implemented during transactions, etcetera. After completion of editing preferences at step 363, processing may proceed to step 303 for presentation of an option menu to the user.

In the above exemplary embodiment, reference has been made to prepaid accounts and/or post paid transactions managed by controlled environment information management system 110. Balances associated with such accounts and transactions are preferably maintained according to embodiments of the present invention to reflect the value of goods and/or services acquired or provided. Accordingly, account balance database 201 is preferably updated to reflect transactions conducted by controlled environment information management system 110. It should be appreciated that payment for goods and/or services associated with transactions performed using controlled environment information management system 110 may be owed to various providers not directly affiliated with controlled environment information management system 110. Accordingly, controlled environment information management system 110 of a preferred embodiment provides for accounting and payment of such funds, such as using statement system 202 and/or reporting system 203. For example, controlled environment information management system 110 may periodically, such as on the evening of delivery, execute wire transfers to a prison master account, such as in payment of commissions for telephone calls from a controlled environment facility, to a commissary company, such as in payment of goods and/or services delivered to residents of a controlled environment facility, etcetera.

As discussed above, embodiments of the present invention may make available different combinations of features and functions to particular users. Accordingly, although the above described process flow may be invoked with respect to any number of users, it is expected that the process flow may be altered with respect to some users, such as to provide additional or alternative options to an individual outside of the controlled environment facility. For example, a friend or family member of a resident may dial a specific telephone number to access controlled environment information management system 110 and thus be presented with options, perhaps including some or all those set forth above, for interacting therewith. Presentation of such options may follow user identity verification, such as described above with respect to a resident, if desired.

According to one embodiment, a friend or family member of a resident may be presented with an initial menu of options (corresponding to that of step 303 discussed above) having such options as "make a phone call," "order commissary," "order medical," "retrieve balance," "deposit funds to an account," and "manage account/preferences." Various ones of these options may provide operation as described above. However, other ones of these options may provide operational functionality not available to other users, such as residents.

For example, the option "deposit funds to an account" may allow a user to create and/or provide funds to an account, such as an account associated with a particular resident of the controlled environment facility. A user selecting "deposit funds to an account" may be prompted with respect to an amount of deposit. Prompting with respect to an amount of deposit may include prompting with respect to allocation of the funds, such as restricting the funds for use in commissary purchases or allocating some percentage of the funds for commissary and another percentage for telephone calls. The user may be enabled to deposit funds using such means as check, credit card, electronic funds transfer, and/or the like. Additionally, the user may be prompted to identify the facility they want to deposit funds for, the resident that is going to get the benefit of those funds, the purposes for which the funds may be used, whether the individual wishes to be a responsible party for the account (and thus be subsequently contacted when funds are depleted), etcetera.

Preferred embodiments of the present invention implement identification with respect to individuals making deposits to accounts. For example, passive identification techniques, such as obtaining drivers license, social security number, address, etcetera may be utilized. Additionally or alternatively, more active technologies, such as acquiring a voice print for comparison with an exemplar, PIN number challenges, etcetera may be utilized in identification of individuals. According to one embodiment, voice print information is sampled at the time of a transaction and stored for later use in identifying the individual if any issue with respect to identity arises.

Various other operational aspects may be different as among users and user groups. For example, individuals outside of the controlled environment facility may be provided with a commissary "catalog" from which to make orders from. According to one embodiment, a product catalog of items which may be sent to residents of the controlled environment facility can be requested by such individuals. Additionally or alternatively, a product catalog may be made available via the Internet or by direct mail, if desired.

Another variation on an operational aspect as experienced by particular users may comprise an individual outside of the controlled environment facility being prompted for payment with respect to particular transactions, such as the aforementioned commissary orders, rather than deducting the appropriate funds from a prepaid account. For example, rather than deducting funds from an account which has been established for the benefit of a resident of the controlled environment facility, a user outside of the controlled environment facility may be queried for a credit card or check information.

It should be appreciated that operation of exemplary embodiments as set forth above provides a number of unique features. For example, embodiments of the present invention provide a voice interface, listening for and communicating selected items preferably along with their price, to thereby facilitate transactions using readily available user terminals, such as telephones. Moreover, embodiments of the present invention checks on item restrictions, listens for and communicates quantities, checks on quantity restrictions, thereby providing robust transaction control. Additionally, inventory is confirmed and balance availability is confirmed according to embodiments of the invention. Preferred embodiments communicates back the selected item, total quantity (adjusted if necessary, such as based upon restrictions and/or account balance), and total value, as users create orders, thereby providing increased customer satisfaction. Embodiments allow a user to select items, delete items, accept an order, and cancel an order at various points in the process, thereby giving a user substantial control in the process.

A unique feature of an embodiment of the present invention is that with respect to a collect call placed by a resident of the controlled environment facility, the called party is prompted to accept charges for the call which identifies an individual actually responsible for payment of costs on behalf of the resident. When combined with the account creation and management features of preferred embodiments, this relationship may be leveraged to establish an individual to be fiscally responsible for commissary orders or other items that the resident may utilize. Such fiscal responsibility may comprise soliciting prepaid funds from the individual. However, embodiments of the present invention implement processes such that the individual or associated household provides fiscal responsibility for items that that resident may consume in various transactions through post payment, such as may be billed through local exchange carrier (LEC) billing or other post paid collection techniques.

According to one embodiment, the called party is queried as to whether they wish to be fiscally responsible for the resident's transactions, perhaps up to a particular dollar amount and/or limited to particular types of transactions, such as using interrupt messaging as shown and described in the above referenced patent application entitled "System and Method for Account Establishment and Transaction Management Using Interrupt Messaging." If the called party indicates consent to the fiscal responsibility, the controlled environment information management system may present an agreement, perhaps by playing the terms of the agreement audibly and/or by providing a text copy by mail or electronic mail. The called party may verbally accept the terms of the agreement, wherein the controlled environment information management system would preferably record the called party's acceptance of the terms, perhaps also recording the terms themselves as played to the called party, thereby creating a "speak wrap" type agreement analogous to the "click wrap" agreements known in the art. Additionally or alternatively, the called party may execute a text copy of the agreement and return such for accepting fiscal responsibility.

Another unique feature provided according to embodiments of the present invention is the ability to record transactions for later play back. For example, controlled environment information management system 110 may digitally record transactions as performed thereby, perhaps including appended information such as the identity of the parties, numbers dialed, etcetera. Such recordings may be useful even outside of the telephone calling feature, such as to settle a dispute where a users claims to have ordered or not to have order a particular item.

Embodiments of the present invention facilitate providing transactions with respect to particular controlled environment facilities which might not otherwise be availed of such transactions. For example, there are various service companies (e.g., commissary service providers) that will not service small facilities, such as because it does not make economic sense. However, embodiments of the present invention create a standard interface so that even small controlled environment facilities jails can be economically served by service companies. For example, due to the reduction of paper, elimination of manual processing, avoidance of installing specialized equipment, etcetera, service companies may be able to serve controlled environment facilities which heretofore were not economical to service. Additionally or alternatively, such controlled environment facilities may be combined, such as through networking of controlled environment information management systems and/or sharing of centralized controlled environment information management systems of the present invention, thereby making it economically feasible to conduct the aforementioned transactions with respect to those controlled environment facilities.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing information with respect to a prison facility, said method comprising:
   providing an information management system integrating goods acquisition functionality and telephone calling functionality;
   establishing accounts associated with inmates of said prison facility;
   establishing an account for the benefit of a particular inmate comprising designating a responsible party, other than said particular inmate, to be contact for increasing said funds level when determined to be too low;
   using said information management system to conduct transactions associated with inmates of said prison facility, said transactions including at least goods acquisition and telephone calling services, wherein payment for said acquisition of said goods and said telephone calling services of ones of said transactions is provided using appropriate ones of said accounts;
   presenting a menu of available services to an inmate, the available services including initiating a telephone call, ordering physical goods from a commissary within the prison facility, and ordering selected physical goods for delivery to a person outside the prison facility;
   receiving a selection from the inmate indicating ordering of the selected physical goods for delivery to a person outside the prison facility;
   charging an appropriate one of said accounts associated with the inmate for the selected physical goods;
   determining when a funds level of a particular one of said accounts associated with a particular goods acquisition transaction is too low;
   detecting when the particular inmate places a call to said responsible party using said information management system;
   interrupting the call between the particular inmate and said responsible party to play a message soliciting additional funds from the responsible party; and
   delivering the selected physical goods to the person outside the prison facility, the person designed by the inmate.

2. The method of claim 1, wherein establishing an account for the benefit of a particular inmate is accomplished by a person outside of said prison facility.

3. The method of claim 1, wherein establishing an account for the benefit of a particular inmate comprises:
   establishing one or more purposes for which said account is to be used.

4. The method of claim 1, wherein establishing an account for the benefit of a particular inmate comprises:
   establishing limits with respect to the extent to which said account may be used in conducting one or more types of transactions.

5. The method of claim 1, wherein said call is placed contemporaneously with the inmate ordering of the selected physical goods for delivery to a person outside the prison facility.

6. The method of claim 1, further comprising:
   setting a flag with respect to said responsible party when said funds level is determined to be too low, said interacting with said responsible party being accomplished through reference to said flag a next time a call is placed to said responsible party.

7. The method of claim 1, wherein said using said information management system engine to conduct transactions comprises:
   using interactive voice response to interface with users of said information management system.

8. The method of claim 7, wherein said interactive voice response includes voice command recognition.

9. The method of claim 1, wherein said using said information management system to conduct transactions comprises:
   using biometric user identification technology.

10. The method of claim 9, wherein said biometric user identification technology is selected from the group consisting of:
    voice print technology;
    finger print technology;
    iris print technology; and
    retinal print technology.

11. The method of claim 1, further comprising;
    delivering items to an inmate of said prison facility as ordered by said inmate.

12. The method of claim 1, further comprising:
    delivering items to an inmate of said prison facility as ordered by a person outside of said prison facility.

13. The method of claim 1, wherein delivery of the selected physical goods to the person outside the prison facility is performed by a business service provider located outside of the prison facility.

14. A computer program product have a computer readable medium having computer program logic recorded thereon for use in managing information with respect to a prison facility, said computer program product comprising:
    code for providing an information management services integrating goods acquisition functionality and telephone calling functionality;
    code for establishing accounts associated with inmates of said prison facility;
    code for establishing an account for the benefit of a particular inmate comprising designating a responsible party, other than said particular inmate, to be contact for increasing said funds level when determined to be too low;
    code for using said information management services to conduct transactions associated with inmates of said prison facility, said transactions including at least goods acquisition and telephone calling services, wherein payment for said transactions is provided using appropriate ones of said accounts;
    code for presenting a menu of available services to an inmate, the available services including initiating a telephone call, ordering physical goods from a commissary within the prison facility, and ordering selected physical goods for delivery to a person outside the prison facility;

code for receiving a selection from the inmate indicating ordering of the selected physical goods for delivery to a person outside the prison facility;

code for charging an appropriate one of said accounts associated with the inmate for the selected physical goods;

code for determining when a funds level of a particular one of said accounts associated with a particular goods acquisition transaction is too low;

code for detecting when the particular inmate places a call to said responsible party using said information management system;

code for interrupting the call between the particular inmate and said responsible party to play a message soliciting additional funds from the responsible party; and code for delivering the selected physical goods to the person outside the prison facility, the person designed by the inmate.

15. The computer program product of claim 14, wherein said code for establishing an account for the benefit of a particular inmate comprises:

code for establishing one or more purposes for which said account is to be used.

16. The computer program product of claim 14, wherein said code for establishing an account for the benefit of a particular inmate comprises:

code for establishing limits with respect to the extent to which said account may be used in conducting one more types of transactions.

17. The computer program product of claim 14, further comprising:

code for setting a flag with respect to said responsible party when said funds level is determined to be too low, said interacting with said responsible party being accomplished through reference to said flag a next time a call is placed to said responsible party.

18. The computer program product of claim 14, wherein delivery of the selected physical goods to the person outside the prison facility is performed by a business service provider located outside of the prison facility.

* * * * *